H. D. COLMAN.
MACHINE FOR PREPARING WARPS FOR WEAVING.
APPLICATION FILED MAY 18, 1906.
1,115,399.
Patented Oct. 27, 1914.
18 SHEETS—SHEET 6.
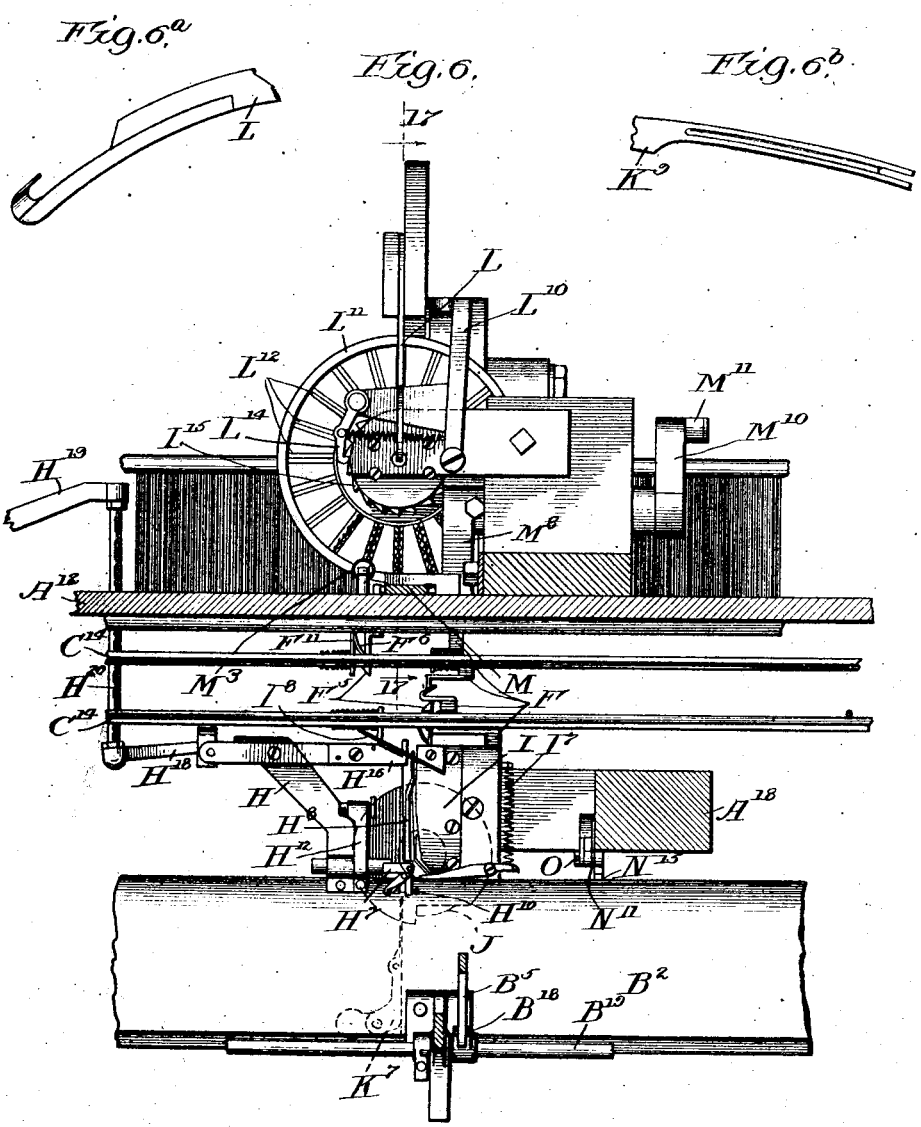

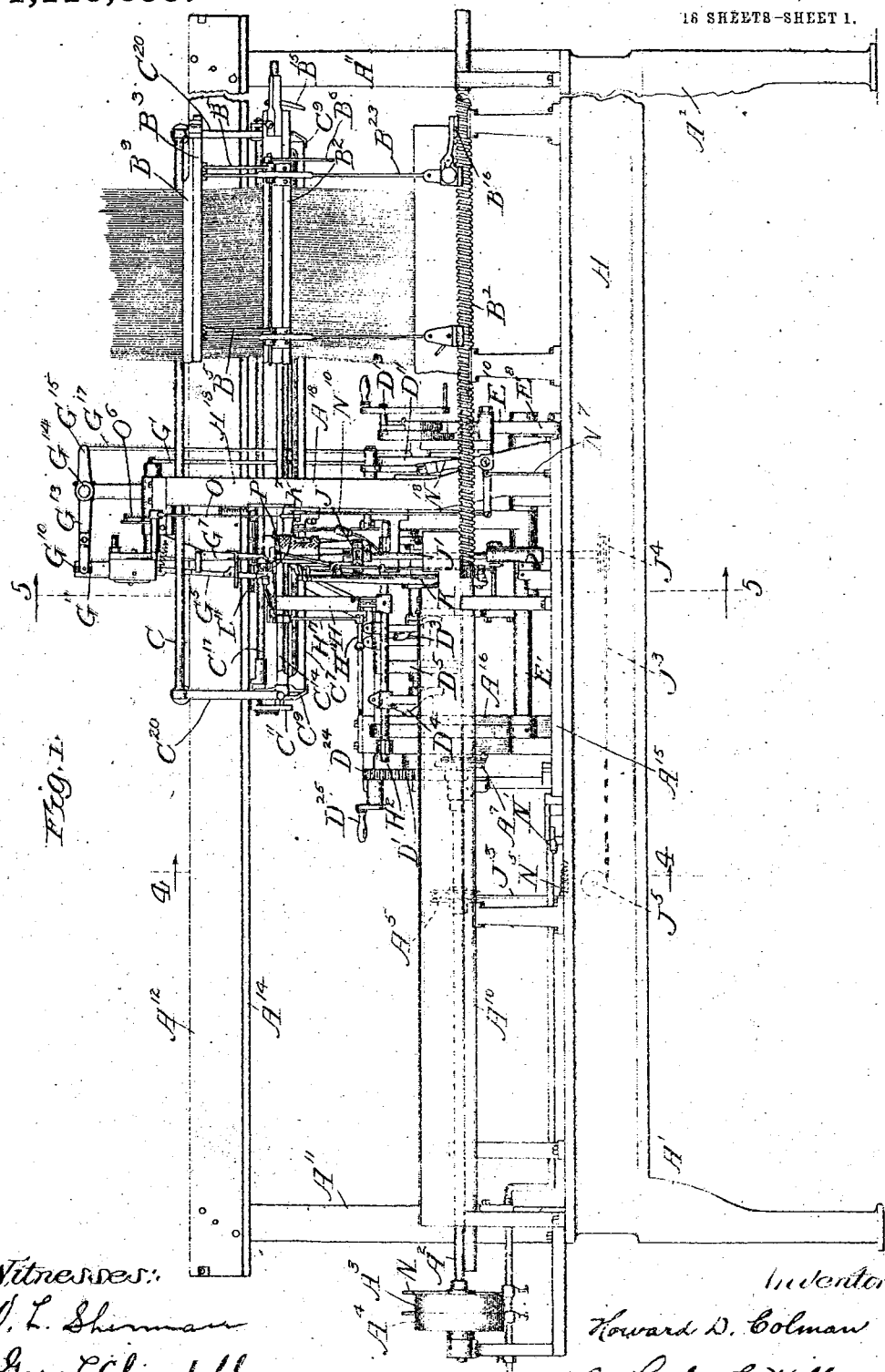

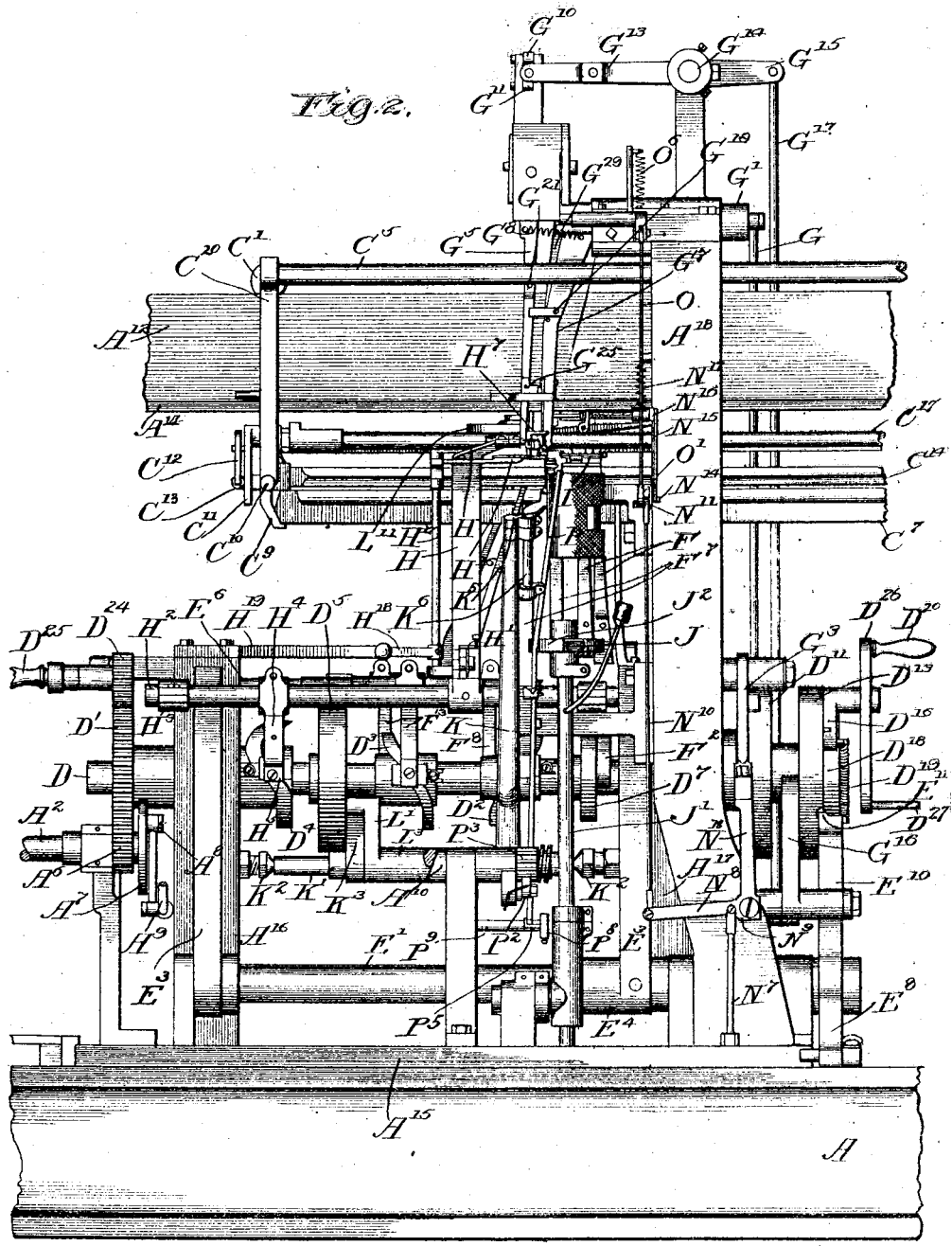

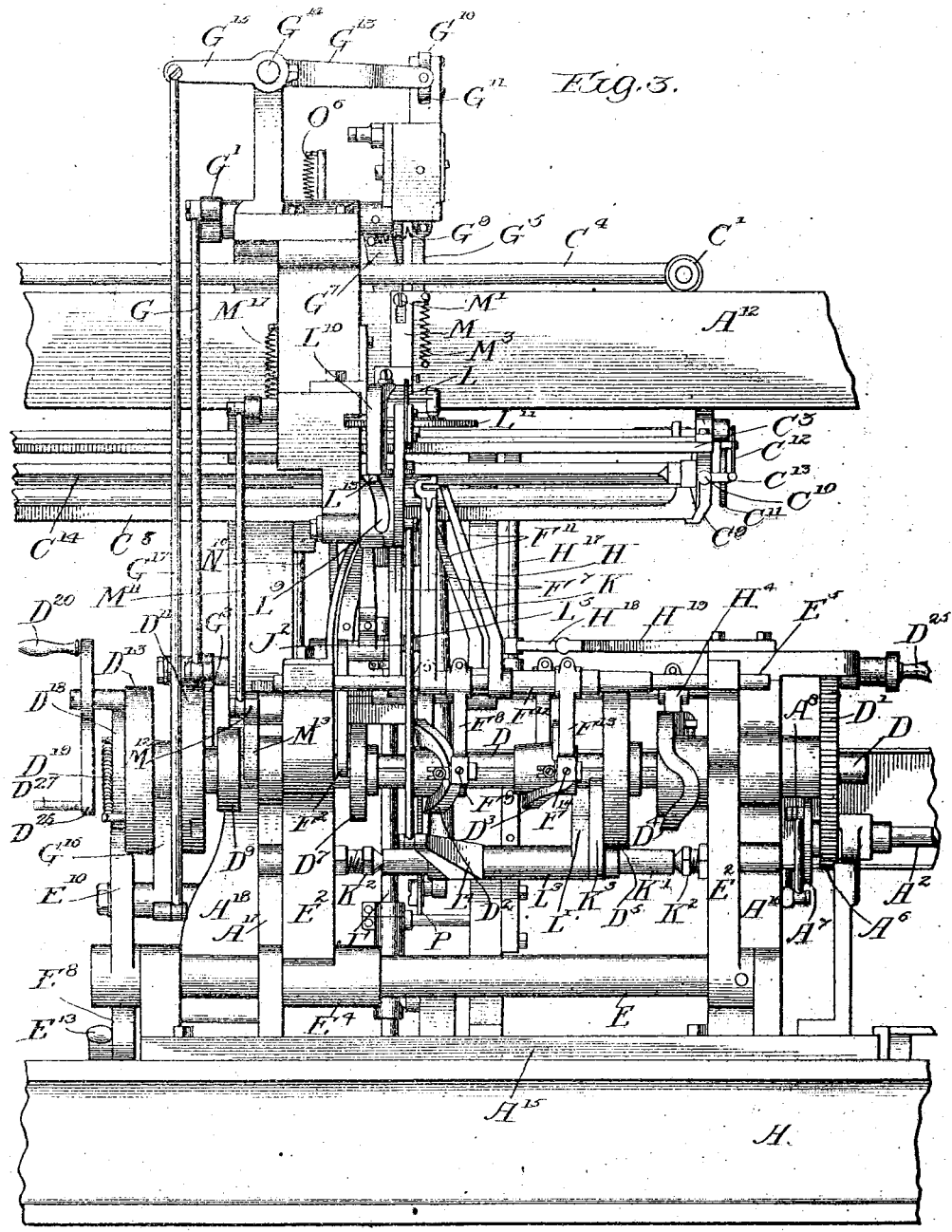

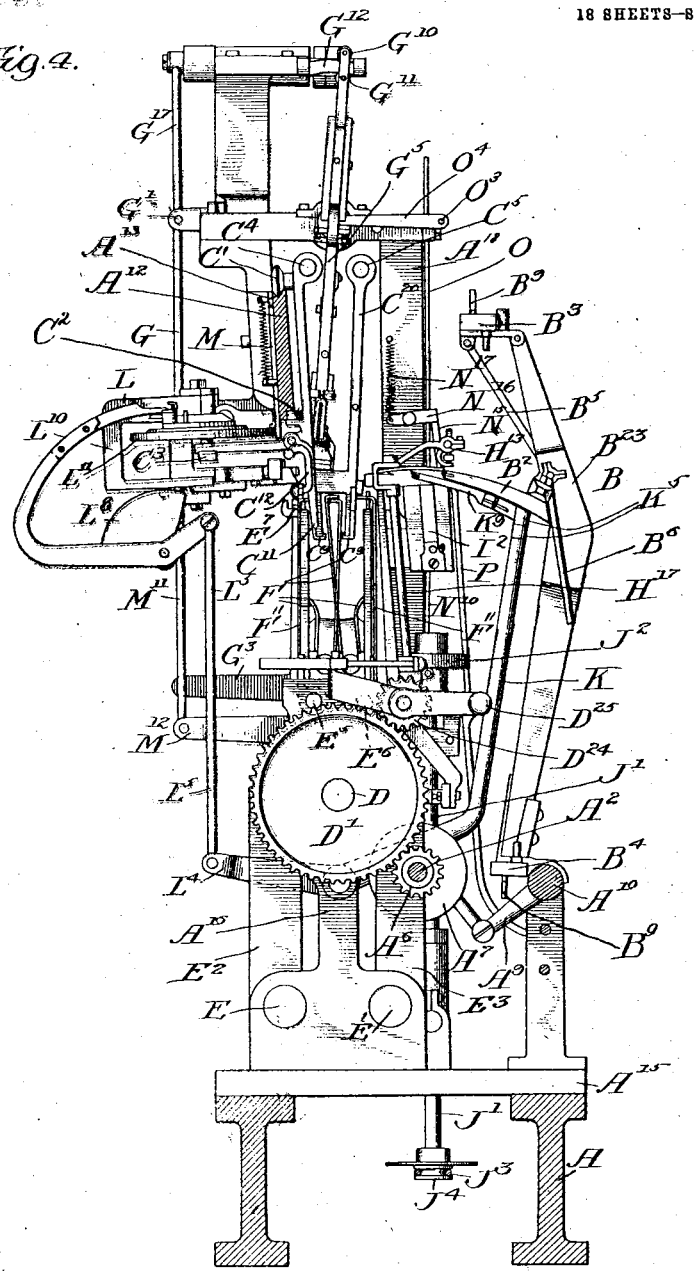

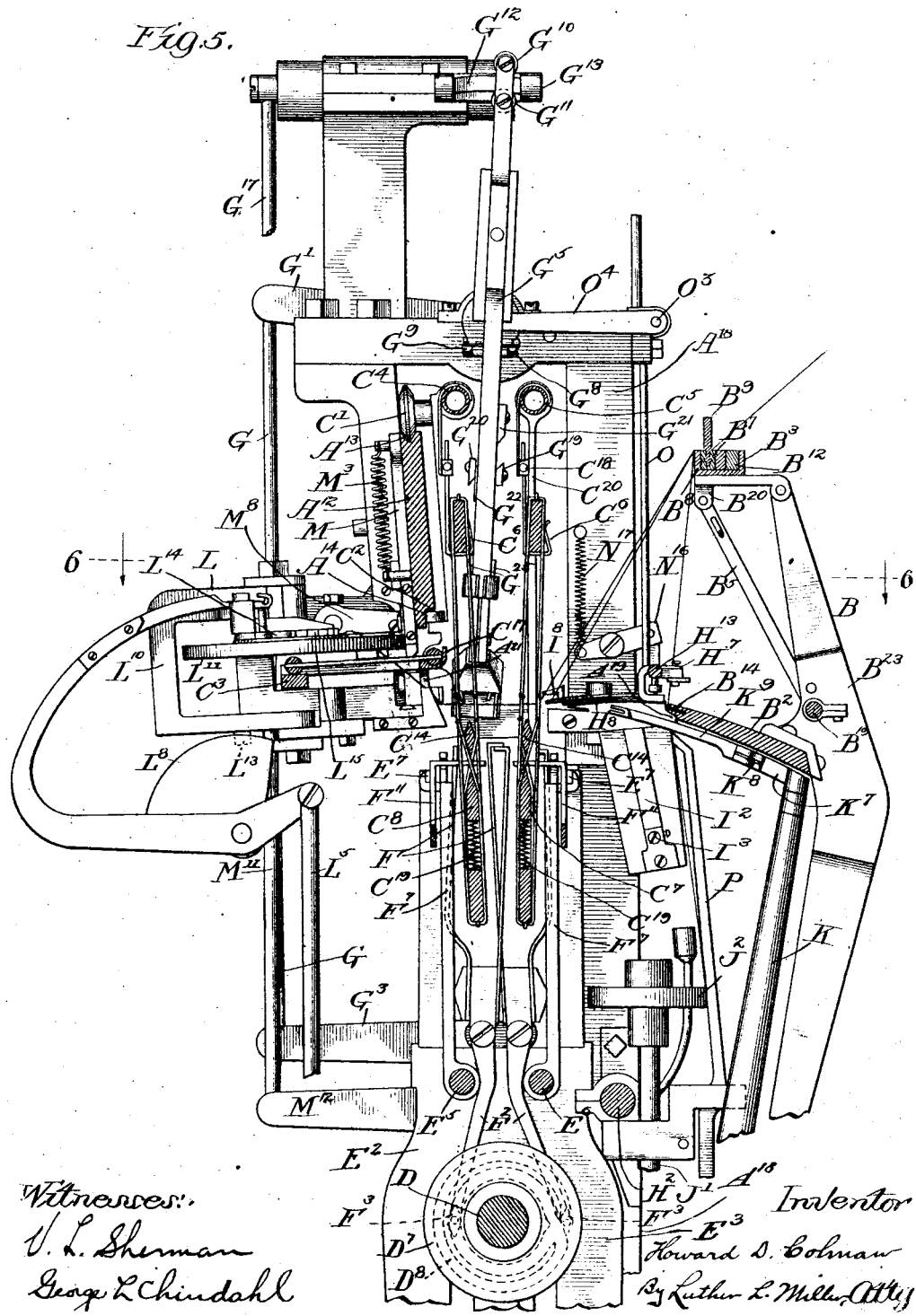

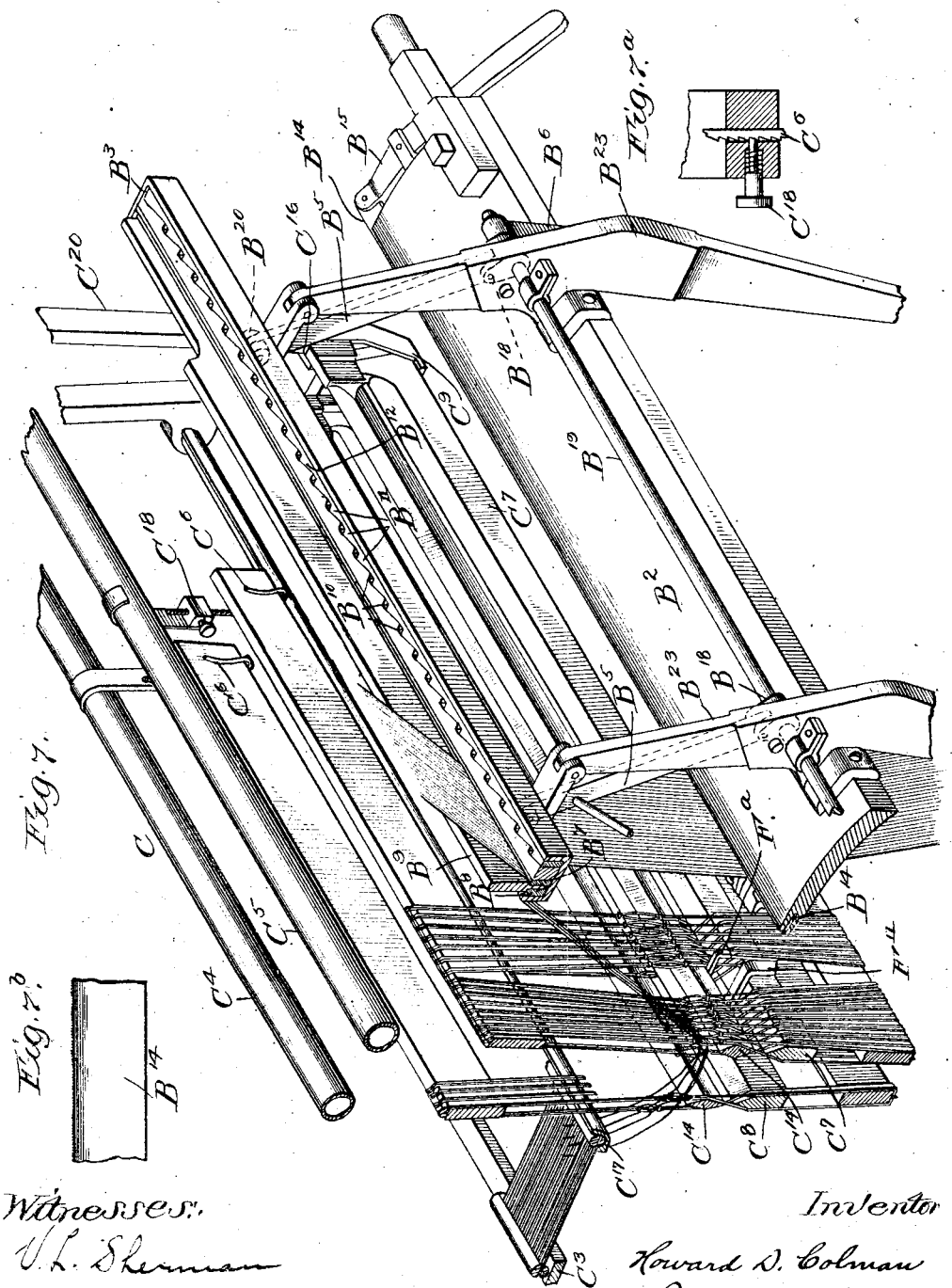

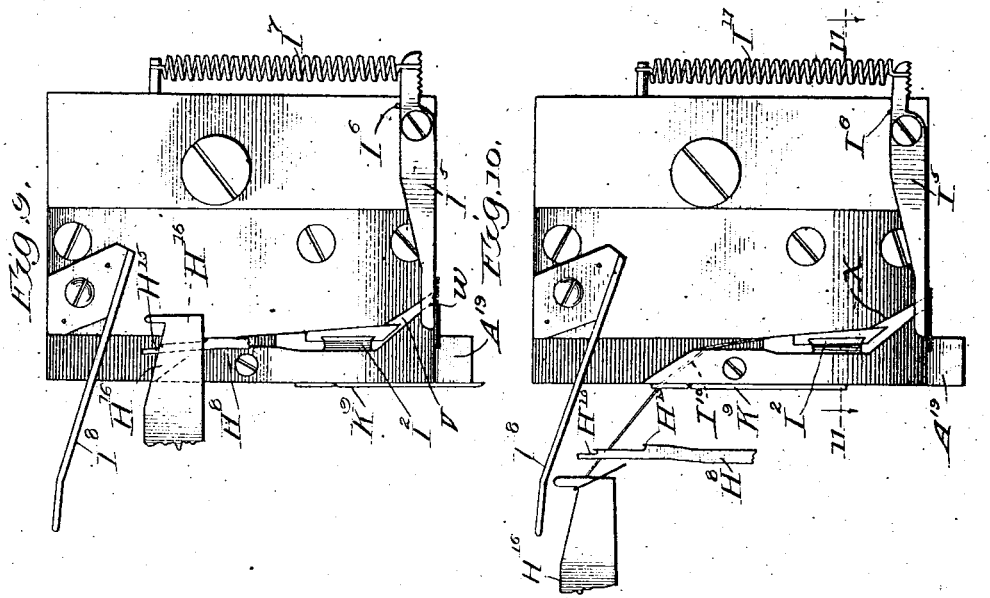
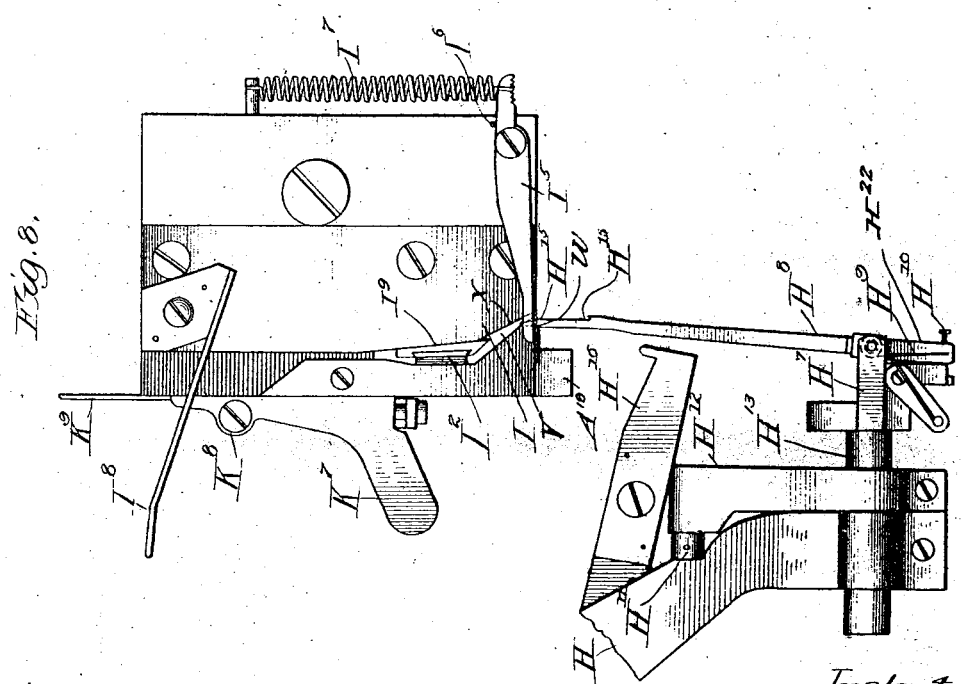

H. D. COLMAN.
MACHINE FOR PREPARING WARPS FOR WEAVING.
APPLICATION FILED MAY 18, 1906.
1,115,399.
Patented Oct. 27, 1914.
10 SHEETS—SHEET 9.
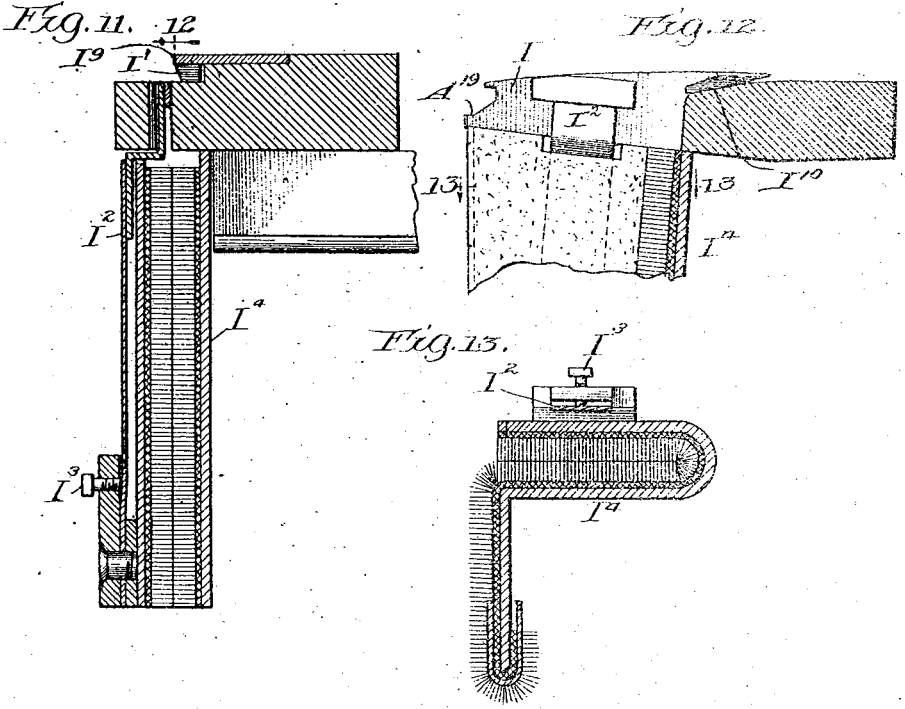
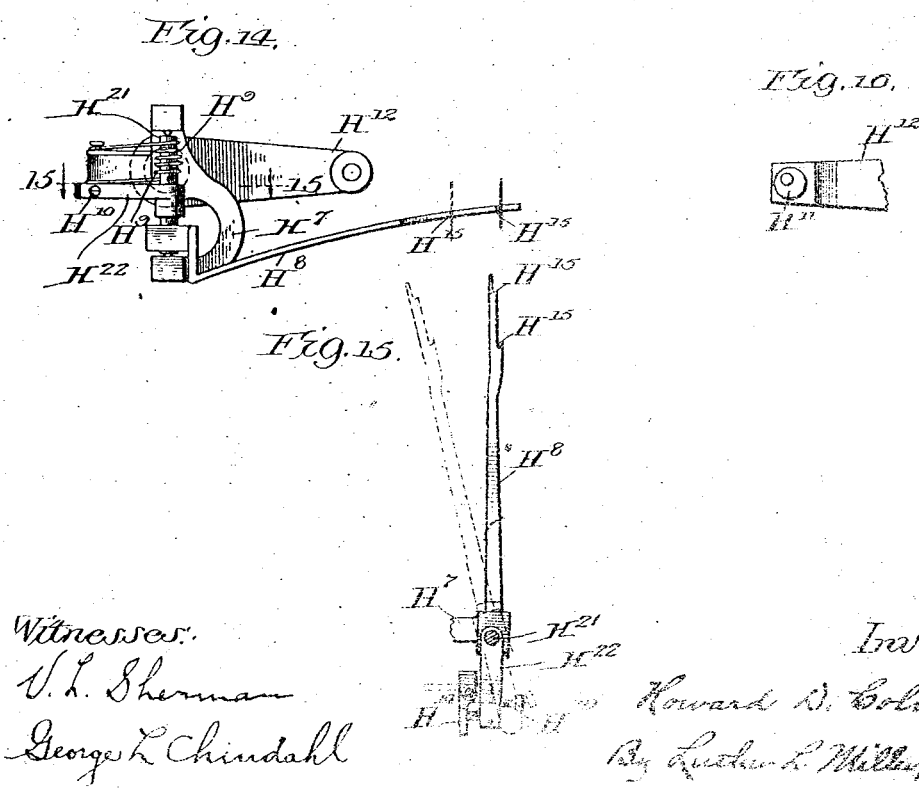
Witnesses:
V. L. Sherman
George L. Chindahl
Inventor
Howard D. Colman
By Luther L. Miller, Atty.

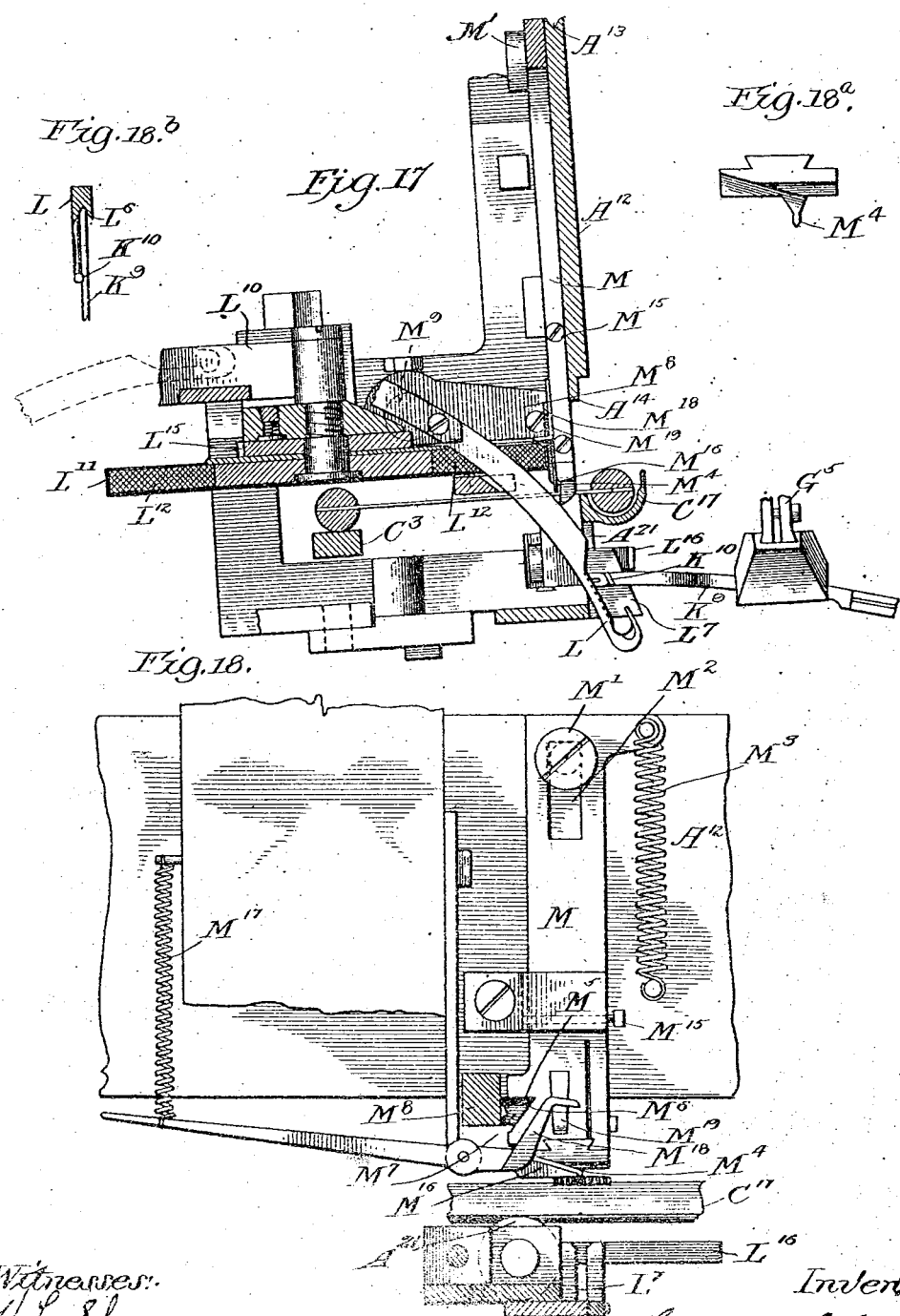

H. D. COLMAN.
MACHINE FOR PREPARING WARPS FOR WEAVING.
APPLICATION FILED MAY 18, 1906.
1,115,399.
Patented Oct. 27, 1914.
18 SHEETS—SHEET 11.
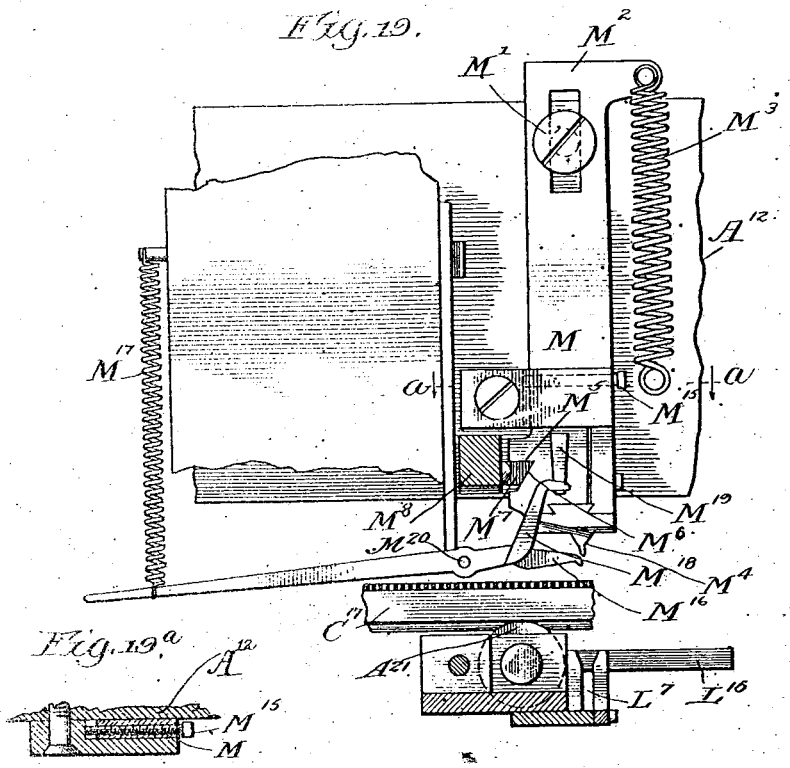
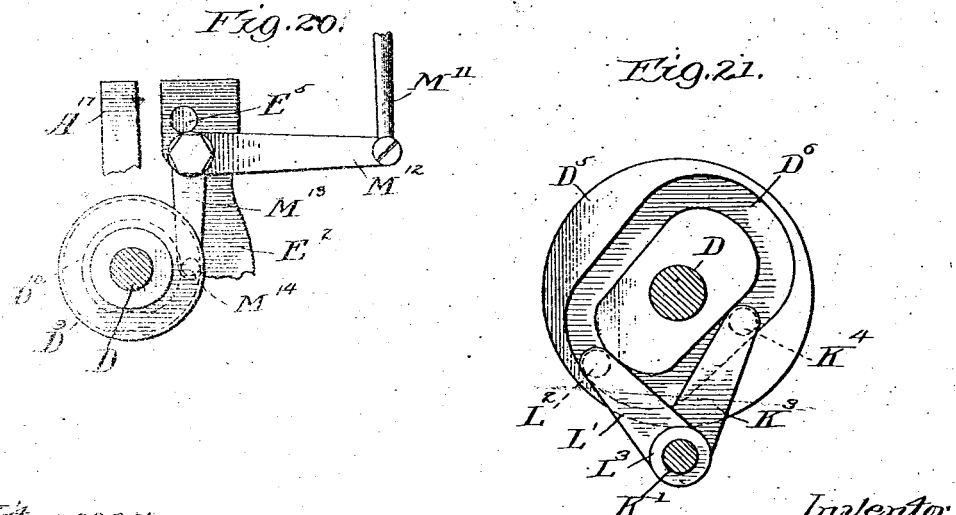
Witnesses:
V. L. Sherman
George L. Chindahl
Inventor
Howard D. Colman
By Luther L. Miller, Atty H. D. COLMAN.
MACHINE FOR PREPARING WARPS FOR WEAVING.
APPLICATION FILED MAY 18, 1906.
1,115,399.
Patented Oct. 27, 1914.
18 SHEETS—SHEET 13.
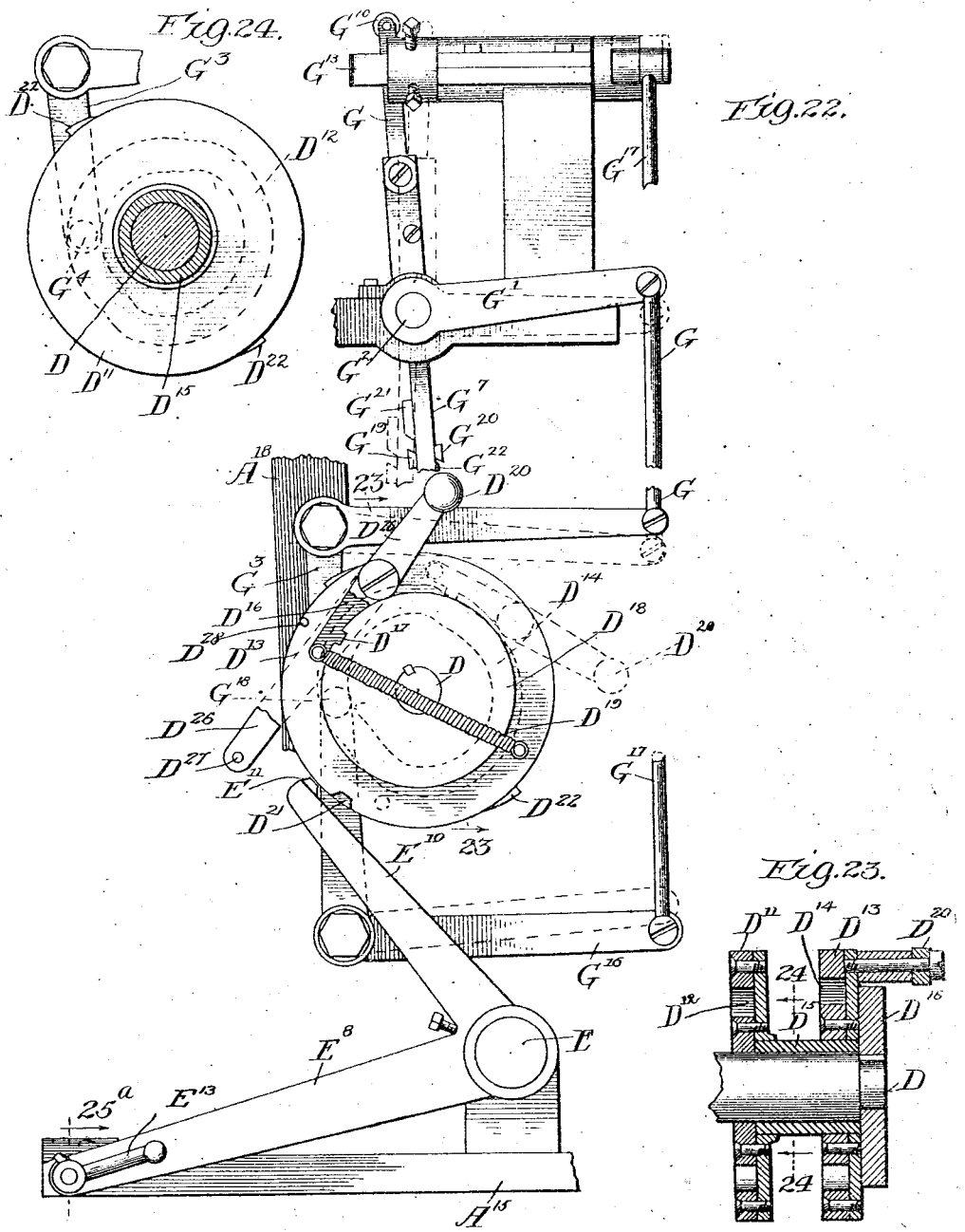

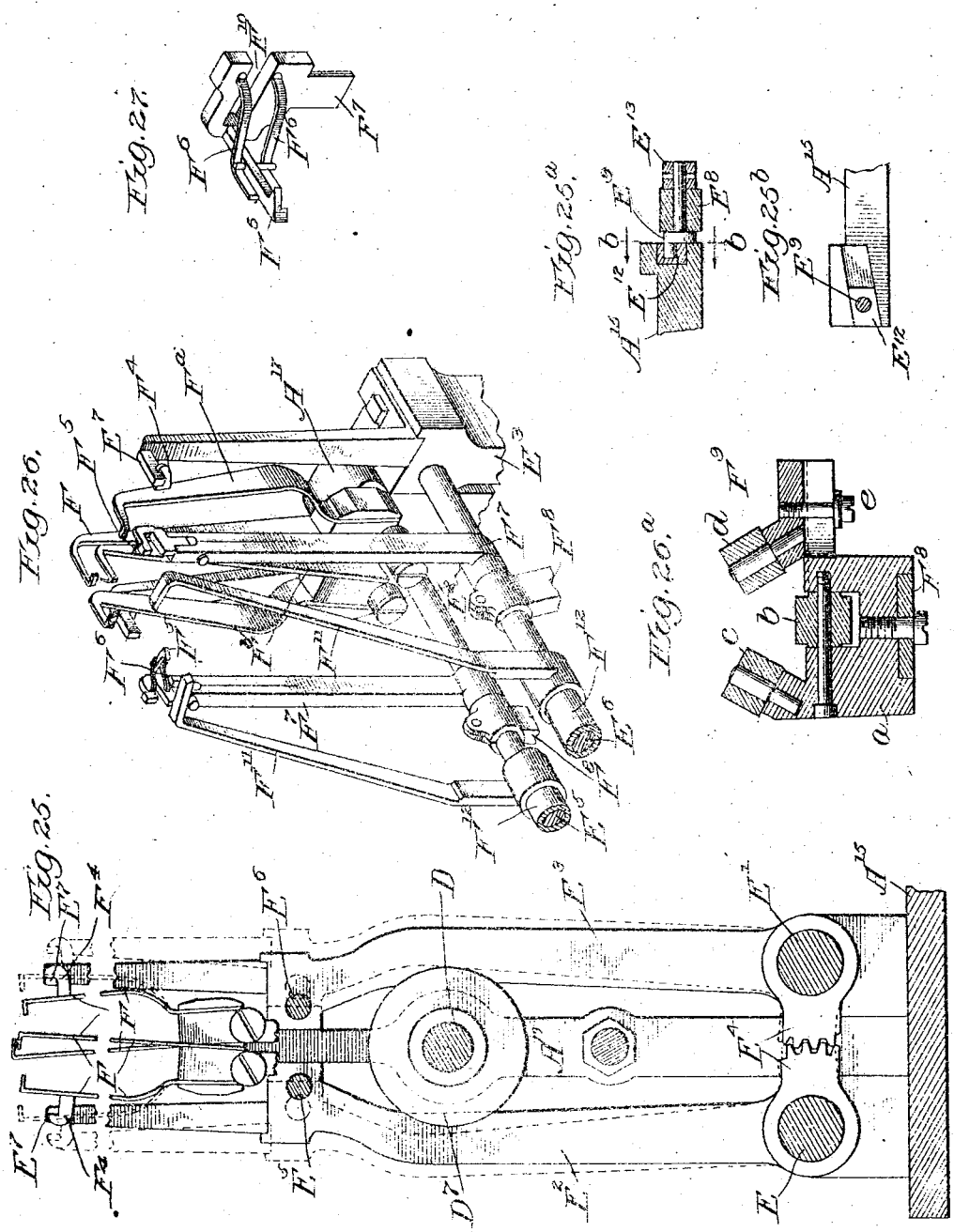

H. D. COLMAN.
MACHINE FOR PREPARING WARPS FOR WEAVING.
APPLICATION FILED MAY 18, 1906.
1,115,399.
Patented Oct. 27, 1914.
18 SHEETS—SHEET 14.
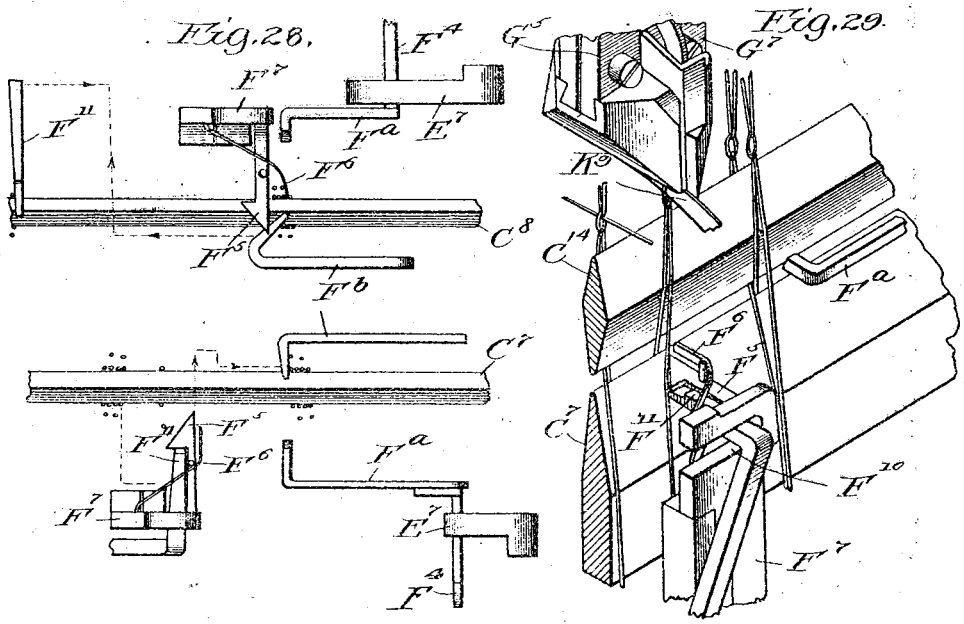
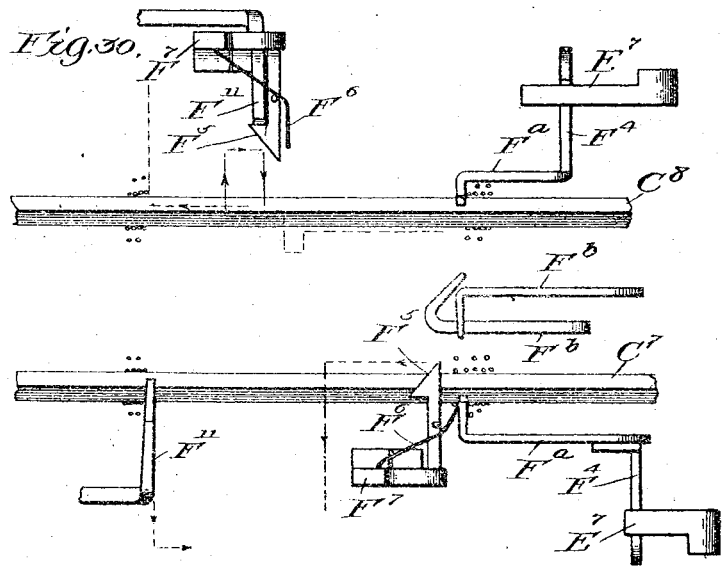
Witnesses:
V. L. Sherman
George L. Chindahl
Inventor.
Howard D. Colman
By Luther L. Miller, Atty.

H. D. COLMAN.
MACHINE FOR PREPARING WARPS FOR WEAVING.
APPLICATION FILED MAY 18, 1906.
1,115,399. Patented Oct. 27, 1914.
18 SHEETS—SHEET 15.
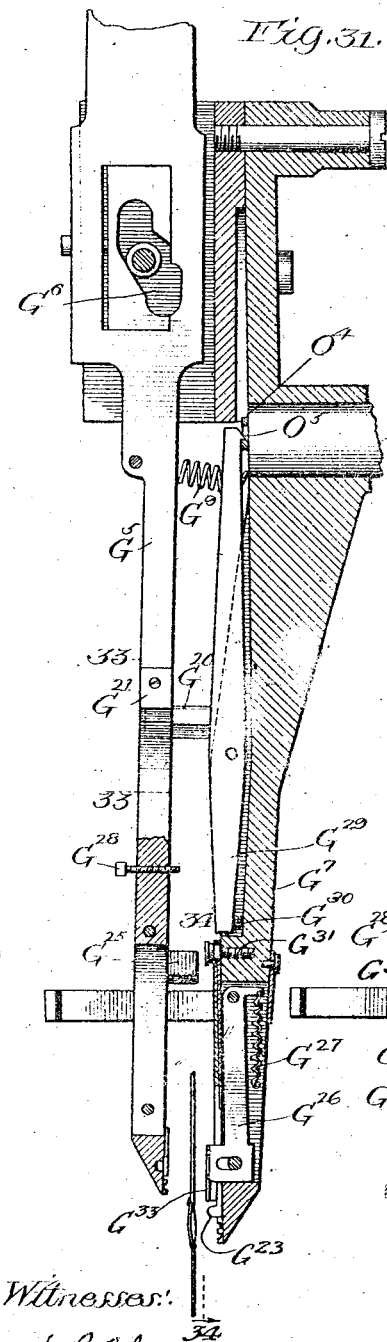
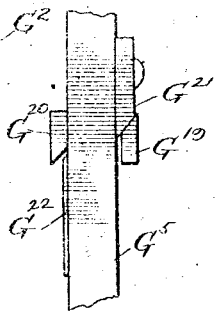
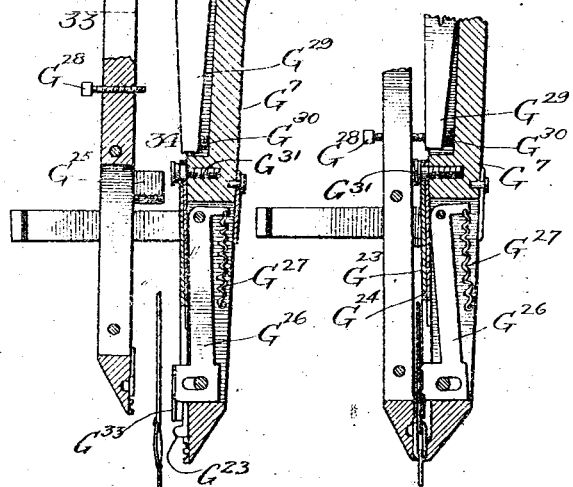
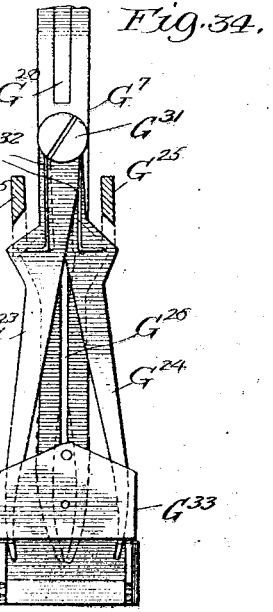
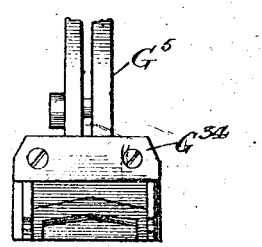
Witnesses:
V. L. Sherman
George L. Chindahl
Inventor:
Howard D. Colman
By Luther L. Miller Atty.

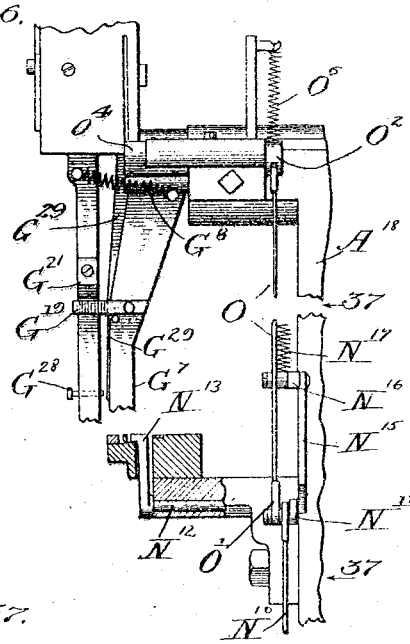
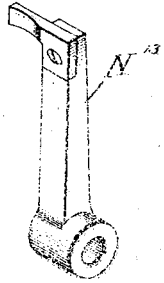
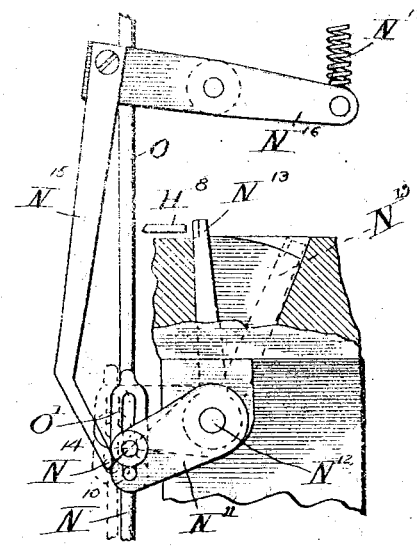
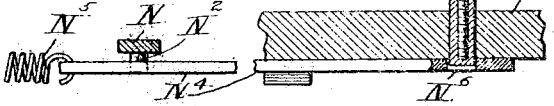

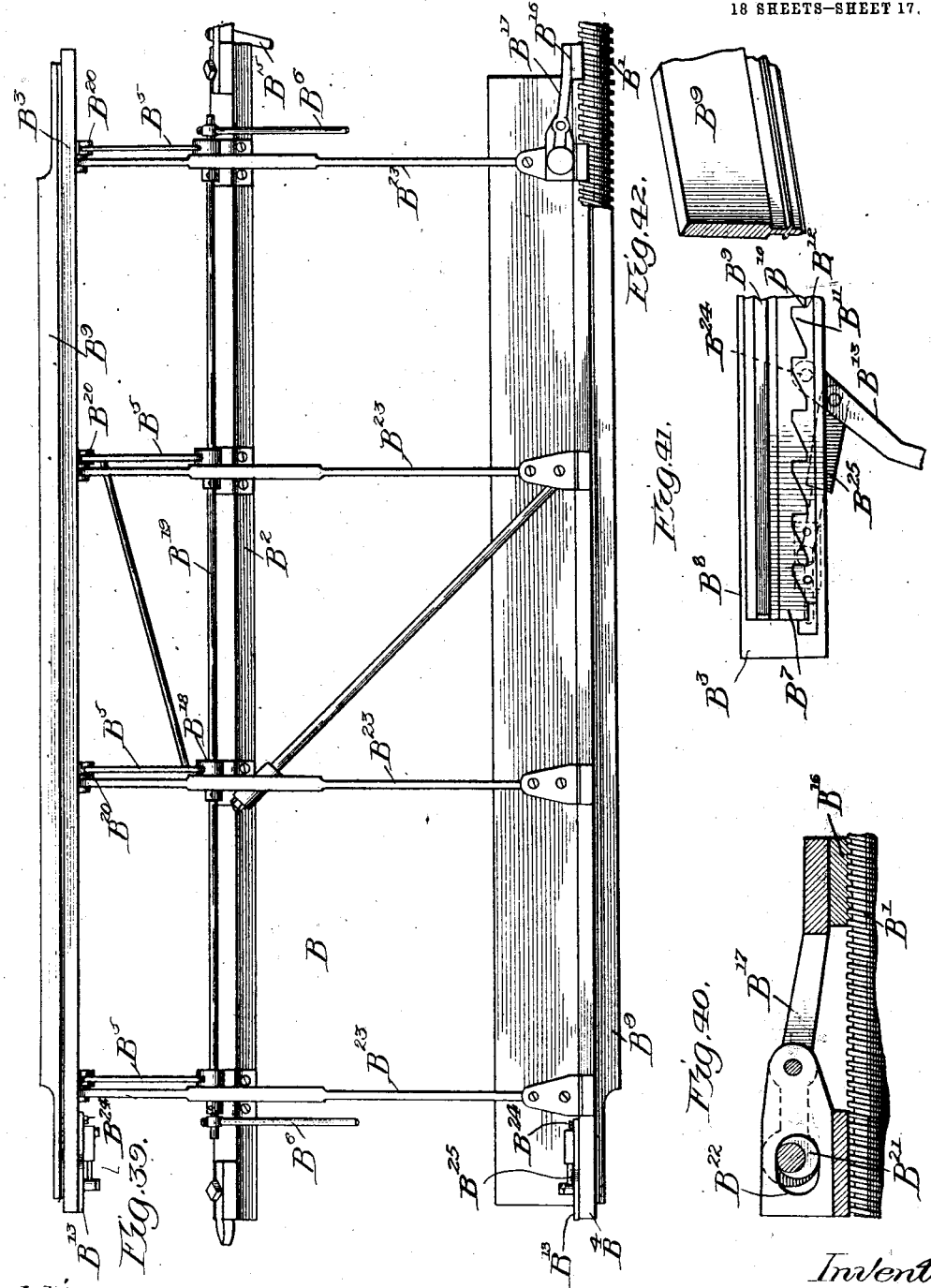

H. D. COLMAN.
MACHINE FOR PREPARING WARPS FOR WEAVING.
APPLICATION FILED MAY 18, 1906.
1,115,399.
Patented Oct. 27, 1914.
18 SHEETS—SHEET 18.
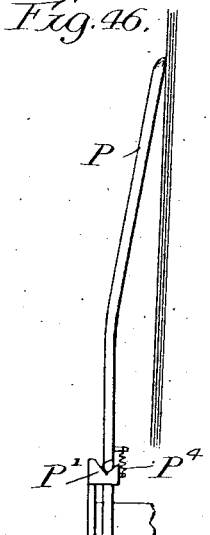
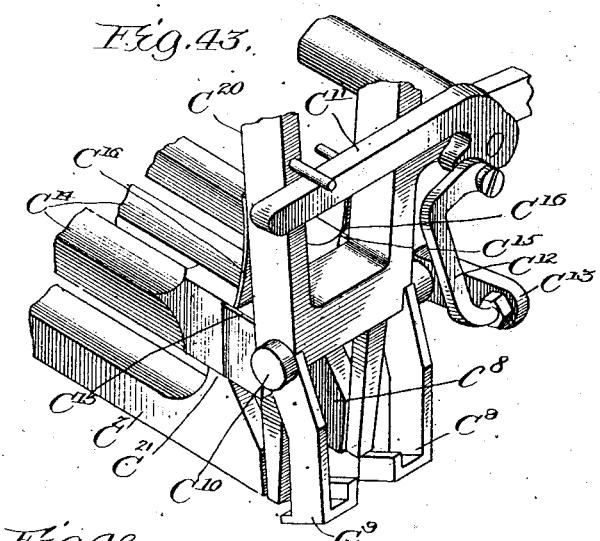
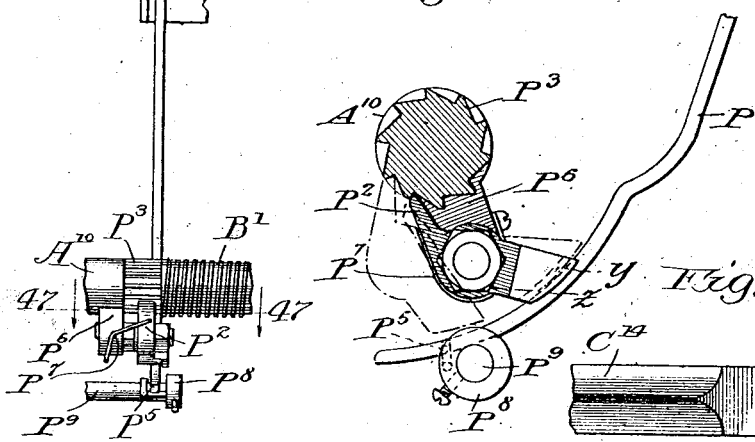
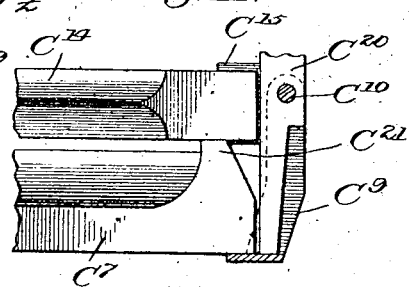
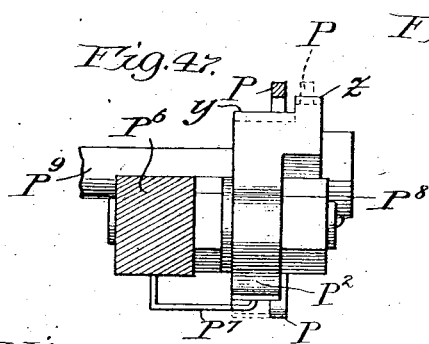
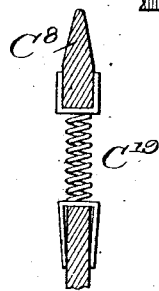
Witnesses:
V. L. Sherman
George L. Chindahl
Inventor
Howard D. Colman
By Luther L. Miller Atty

UNITED STATES PATENT OFFICE.

HOWARD D. COLMAN, OF ROCKFORD, ILLINOIS, ASSIGNOR, BY MESNE ASSIGNMENTS, TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

MACHINE FOR PREPARING WARPS FOR WEAVING.

1,115,399.  Specification of Letters Patent.  Patented Oct. 27, 1914.

Continuation of application Serial No. 122,381, filed September 6, 1902, and continuation in part of application Serial No. 526,856, filed October 24, 1894. This application filed May 18, 1906. Serial No. 317,547.

*To all whom it may concern:*

Be it known that I, HOWARD D. COLMAN, a citizen of the United States, residing at Rockford, in the county of Winnebago and State of Illinois, have invented certain new and useful Improvements in Machines for Preparing Warps for Weaving, of which the following is a specification.

The invention disclosed herein relates to machines for preparing warps for weaving as, for example, a machine for drawing the ends of warp threads through the heddle eyes of loom harness and through the spaces of a loom reed. In such machines the threads are selected singly and successively from one edge of a warp and presented to an operating mechanism, movement between the warp and the selecting mechanism being produced so as to cause one to travel with relation to the other.

One of the objects of this invention is to provide means for so controlling the movement-producing means that operative relationship shall be established between each successive thread of the warp and the thread-selecting mechanism, notwithstanding variations in the widths of warps, irregular spacing of the threads of a given warp, and differences in the spacing of the threads of different warps.

Another of the objects of this invention is the production of an improved mechanism for placing the ends of warp threads, wound upon a loom beam, through the heddle eyes of loom harness and through the spaces of a loom reed.

Another object of the invention is to provide improved means for establishing operative relationship between the successive heddle eyes and reed spaces, on the one hand, and the operating mechanism on the other hand.

A further object is to provide means for compensating for differences between the widths of the harnesses and the reed and the width of the warp.

A further object of the invention is the production of an improved harness and reed carriage.

The invention further relates to an eye-spacing mechanism for selecting and releasing the heddle eyes one at a time, first from one harness and then from the other, also to an eye-facing mechanism for placing the harness eyes so selected, in position to receive the needle carrying a warp thread.

The invention also relates to the further improvements hereinafter set forth.

This application is a continuation of application Serial No. 122,381 filed by me on September 6, 1902, which latter application is a continuation of an application filed by me on October 24, 1894, Serial No. 526,856.

In the accompanying drawings, Figure 1 is a side elevation of a warp-drawing machine embodying the features of my invention, a portion of the warp carriage and of the frame of the machine being broken away and the harness and reed being omitted. Fig. 2 is a similar view, but upon a somewhat larger scale, of the principal parts of the mechanism. Fig. 3 is a rear side elevation of the parts shown in Fig. 2. Fig. 4 is a vertical section through the machine, taken on dotted line 4 4 of Fig. 1. Fig. 5 is a vertical section on dotted line 5 5 of Fig. 1, omitting, however, some of the mechanism in the lower part of said figure, in order to show the remainder upon a larger scale. Fig. 6 is a horizontal section on dotted line 6 6 of Fig. 5. Fig. 6ª is a detail view, showing the end of the thread-hook. Fig. 6ᵇ is a similar view, showing the forward end of the needle. Fig. 7 is a fragmental perspective view showing the position of the reed and harnesses in the machine, also showing the direction of the warp threads in passing through the eyes of the harness and the spaces of the reed. Fig. 7ª is a sectional view through one of the adjustable hooks for supporting the upper harness bars. Fig. 7ᵇ is a fragmental top plan view of the slidable portion of the straight-edge over which the threads are bowed. Fig. 8 is a plan view illustrating the thread-selector mechanism and the thread-guide. The selector in this view is illustrated near its rearmost position. Fig. 9 is a view similar to that of the last preceding figure, showing the selector near the forward limit of its movement, and the stripper about to engage the thread to take it off from said selector. Fig. 10 is a similar view, showing the thread after it has been carried by the selector forward into engagement with the stripper and a portion of said thread pulled out into a horizontal plane to be engaged by the bifurcated forward end of the needle. Fig. 11 is a vertical section on dotted line 11 11 of Fig. 10, showing the thread-guide and the thread-holder. Fig. 12 is a fragmental section on dotted line 12 of Fig. 11. Fig. 13 is a horizontal section on the plane of dotted line 13 13 of Fig. 12. Fig. 14 is a side elevation of the selector. Fig. 15 is a horizontal sectional view on dotted line 15—15 of Fig. 14. Fig. 16 is a fragmental view in side elevation, showing the eccentric for adjusting the vertical angle of the selector. This view is taken from the opposite side of the arm from that shown in Fig. 14. Fig. 17 is a vertical section on dotted line 17—17 of Fig. 6, showing the thread-hook in its lowest position, and the needle in its most forward position, showing also one of the eye-facers. Fig. 18 is a fragmental view showing in side elevation the mechanism for feeding the reed through the machine. In this figure, the feeding plunger is shown in its lowest position, to wit, with its point pressed downward into a space of the reed. Fig. 18ª is an enlarged detail view showing the lower end of the reed feeding plunger and dent opener. Fig. 18ᵇ is a transverse section through the thread-hook, showing the groove therein and the forward end of the needle lying in said groove. Fig. 19 is a view similar to that of Fig. 18, showing the feeding plunger lifted. Fig. 19ª is a transverse section through the feeding plunger on dotted line a—a of Fig. 19, showing the screw for adjusting the side movement of the feeding finger. Fig. 20 is a view illustrating the cam and a portion of the connections for vertically moving the reed-feeding finger. Fig. 21 is a view of the cam that actuates the needle arm and the thread-hook. Fig. 22 represents in side elevation a disconnecting mechanism for the eye-facers, by means of which said eye-facers may be operated by hand to turn them back and grasp an eye which they have missed, their failure to grasp the harness eye having actuated the stop mechanism by means of one of the automatic stop devices. Fig. 23 is a section on dotted line 23 23 of Fig. 22. Fig. 24 is a section on dotted line 24 24 of Fig. 23. Fig. 25 is a transverse, vertical section taken on the same plane as Fig. 5 (dotted line 5 5 of Fig. 1), showing in dotted lines the action of the throw-out mechanism. Fig. 25ª is a section on dotted line 25ª of Fig. 22. Fig. 25ᵇ is a section on dotted line b b of Fig. 25ª. Fig. 26 is a perspective view of the eye-spacer mechanism, showing the detainer-forks, the eye-puller arms and fingers, and the eye-holding arms. Fig. 26ª is a sectional view through one of the roller bearing-blocks for engaging the periphery of the actuating cams. Fig. 27 is a perspective view, about actual size, showing the eye-puller fingers and the auxiliary spring fingers. Fig. 28 is a top plan view of the eye-spacer mechanism, showing in section some of the lower strands of each of the harnesses. The arrows and dotted lines indicate the cycle of movement of the eye-pullers, also of the eye-holders. Fig. 29 is a perspective view of the parts shown in the lower side of Fig. 28 and in the same position as they are shown to occupy in said figure. Fig. 29 also shows the eye-facer jaws and the needle. Fig. 30 is a view similar to that shown in Fig. 28, showing the eye-spacer mechanism in a position assumed at a different point in the cycle of its movement. Fig. 31 is a vertical central section through the eye-facer jaws, showing them open. Fig. 32 is a similar view showing the eye-facers closed upon an eye. Fig. 33 is a fragmental front elevation of the eye-facer jaws, between dotted lines 33 33 of Fig. 31, showing the device for imparting a sidewise rubbing motion to the movable facer-jaw. Fig. 34 is a side elevation of the relatively-stationary eye-facer jaw, taken on dotted line 34 34 of Fig. 31, showing the auxiliary facer-jaws. Fig. 35 is an inner face view of the relatively-movable eye-facer jaw. Fig. 36 illustrates in front elevation an automatic stop mechanism for the eye-facers and the thread-selector. This mechanism is intended to operate when the facer-jaws fail to grasp an eye or the thread selector fails to catch a thread. The figure shows parts broken away to illustrate the trigger-lever acted upon by the thread-selector, also to show the detent device for the belt shifter. Fig. 36ª is a fragmental plan view of the sliding rod that connects the automatic stop mechanism with the belt-shifter. Fig. 37 is an enlarged detail, looking in the direction of the arrows 37 in Fig. 36, showing in side elevation the automatic stop mechanism that operates when the selector fails to catch a thread. Fig. 37ª is a perspective view of the trigger lever shown in side elevation in the last preceding figure. Fig. 38 is a vertical section through the dash-pot for yieldingly arresting the movement of the mechanism when the drive belt is automatically shifted. Fig. 39 is a side elevation of the warp carriage. Fig. 40 is a view, partly in section, illustrating the feed connection between the warp carriage and the screw-threaded feed-shaft. Fig. 41 is a fragmental view illustrating one of the clamps for holding the warp threads in the warp carriage. Fig. 42 is a fragmental perspective view of one of the bars against which the warp threads are clamped in said carriage. Fig. 43 illustrates the means for securing the knife-bars in the reed and harness carriage. Fig. 44 is a fragmental longitudinal sectional view through one of the hooks constituting said means. Fig. 45 illustrates a spring clip for depressing the lower harness bar. Fig. 46 illustrates a sensitive mechanism that controls the feed of the warp carriage. Fig. 47 is a sectional view on dotted line 47 47 of Fig. 46. Fig. 48 is a side view of the lower end of the finger P of the sensitive feed controlling means for the warp carriage.

In the embodiment herein shown of this invention, I provide a supporting frame comprising a bed A having the usual supporting legs $A^1$. A drive shaft $A^2$ is rotatably mounted in suitable bearings above the bed A, and has at its outer end a tight and a loose pulley $A^3$ and $A^4$, respectively. This drive shaft also has a grooved sheave $A^5$ fixed thereon, with a pinion $A^6$ (Fig. 2) and a face plate $A^7$ at the inner end of said shaft. The face plate $A^7$ carries a wrist-pin $A^8$ and has a connecting rod connection with an arm $A^9$ (Fig. 4) fixed on an oscillatory pawl-carrying shaft $A^{10}$ alined with the screw-threaded feed-shaft for the warp carriage, to be hereinafter described. (See Figs. 46 and 48.) At the rear side of the bed and secured to the upper face thereof are two upwardly extending supporting arms $A^{11}$, which at their upper ends carry the fixed guide plate $A^{12}$ extending throughout the length of the machine. The guide plate $A^{12}$ has in its upper edge a groove $A^{13}$ (Fig. 4), and at its lower edge on its face is provided with a rabbet $A^{14}$. About midway of the bed A and affixed to the upper face thereof is a bed plate $A^{15}$ having the upwardly extending bearing posts $A^{16}$ and $A^{17}$ (Fig. 2), and adjacent to the bearing post $A^{17}$ an upright supporting standard $A^{18}$.

The ends of the warp threads (from the warp beam, not shown) to be drawn into the eyes of the harness and through the spaces of the reed, are supported in a carriage B adapted to rest upon the rotatory screw-threaded shaft or carriage-adjusting element $B^1$ and the alined shaft $A^{10}$, and arranged to be fed across the face of the drawing-in mechanism by the intermittent rotation of said screw-threaded shaft. The carriage B leans against a short stationary ledge $A^{19}$ (Figs. 5 and 8) which is carried by the standard $A^{18}$. The warp carriage (shown in detail in Figs. 39 to 42, inclusive, and in its relation to the drawing-in mechanism in Figs. 1, 4, 5 and 7) comprises a frame having a longitudinal bar $B^2$ slightly above its center, two clamps $B^3$ and $B^4$ at its upper and its lower side, and the transverse frame-arms $B^{23}$. The warp threads pass transversely across the face of the carriage between the two clamps $B^3$ and $B^4$. The threads are bowed outward slightly from a right line by the protruding bar $B^2$. The clamp $B^3$ at the upper side of the carriage is pivotally connected with the frame of said carriage, and is susceptible of a slight swinging movement relative to the frame of the carriage and the clamp $B^4$. This movement of the clamp $B^3$ is effected by means of the links $B^5$ (Fig. 7) pivotally connected at their opposite ends with arms $B^{18}$ fixed on an oscillatory shaft $B^{19}$ and with ears $B^{20}$ projecting from the clamp $B^3$, respectively. The oscillatory shaft $B^{19}$ is arranged to be moved by hand levers $B^6$, fixed on the ends of said shaft, and by means of the hand levers $B^6$ and their connections just described the clamp $B^3$ is moved away from the clamp $B^4$ sufficiently to draw the warp threads on the carriage taut between said clamps and bowed intermediate their ends over the bar $B^2$.

Each of the clamps $B^3$ and $B^4$ comprises two clamping jaws $B^7$ and $B^8$ faced with rubber, and an intermediate bar $B^9$ against which the rubber-faced clamping jaws are closed, by which intermediate bar the warp threads are pressed downward between the clamping jaws. The clamping jaw $B^7$ is made movable toward and away from the jaw $B^8$ by means of the inclined teeth $B^{10}$ formed upon its rear face, which teeth correspond with the teeth $B^{11}$ upon a slidable locking bar $B^{12}$, which locking bar is made longitudinally movable by means of the toggle hand lever $B^{13}$ pivoted at $B^{24}$ (Fig. 41) to the frame of the clamp and connected by a link $B^{25}$ to the slidable bar $B^{12}$.

Assuming the clamping jaws $B^7$ and $B^8$ to be opened (as in Fig. 41), the operation of clamping the warp is as follows: The warp is laid across the clamp, and the bar $B^9$ is pressed against the warp to carry the threads into the space between the jaws $B^7$ and $B^8$. The hand lever $B^{13}$ is then swung (to the left in Fig. 41), thus moving the bar $B^{12}$ to the left, and thereby forcing the jaw $B^7$ against the threads and the bar $B^9$, whereby said bar $B^9$ and the warp threads are secured in the clamp. The toggle lever $B^{13}$ throws "over center" to hold the clamp closed.

In the edge of the bar $B^2$ over which the warp threads extend is a thin bar $B^{14}$ (Fig. 5) slightly roughened upon its outer edge (Fig. 7), lying within a longitudinal groove in the face of the bar $B^2$. The bar $B^{14}$ is longitudinally movable in said groove by means of a lever $B^{15}$ (Fig. 7) pivotally connected with one end of said sliding piece and pivotally supported upon the bar $B^2$. The purpose of the slidable bar $B^{14}$ is to slightly divert the threads sidewise after they have been clamped and stretched in the warp carriage so that when each individual warp thread is lifted from the roughened edge of the bar $B^{14}$ by the selector (to be later herein described) the tendency of said thread will be to straighten and move away from the body of warp threads, thus assisting in the separation of the threads. The threads are selected from what may be termed the concave edge of the warp, that is to say, the side away from which the threads are bowed.

The means herein shown for releasably connecting the warp carriage to the feed shaft B' comprises a half-nut B$^{16}$, (Figs. 1, 39 and 40) screw-threaded to correspond with the threaded feed-shaft B$^1$. The half-nut B$^{16}$ is fixed to one end of a lever B$^{17}$ pivotally mounted upon one of the frame-arms B$^{23}$ of the warp carriage, and is arranged to be thrown into and out of engagement with the threads upon said feed shaft by means of an eccentric B$^{21}$ rotatably supported in the opposite end of the lever B$^{17}$, said eccentric lying within an elongated slot B$^{22}$ in said frame-arm.

The reed and the harness are supported upon a carriage C (illustrated in detail in Figs. 43 and 44, and with relation to the remainder of the mechanism in Figs. 1, 2, 3, 4, 5, 6 and 7) movable lengthwise on the guide-plate A$^{12}$ and supported thereby. The bearing rollers C$^1$ (made ball-bearing to reduce friction) lie within the groove A$^{13}$ in the upper edge of said guide-plate, and the rollers C$^2$ lie within the rabbet A$^{14}$ of said guide-plate. The rollers C$^1$ rotate upon horizontal axes and support the weight of the carriage C, while the rollers C$^2$ turn upon vertical axes and prevent lateral movement of the lower edge of said carriage. The carriage C has a rear extension C$^3$ for supporting the reed (the latter lying flat in a substantially horizontal plane) and two horizontal bars C$^4$ and C$^5$ for supporting the two harnesses, the vertically adjustable hooks C$^6$ engaging the upper bars of said harnesses. These horizontal bars C$^4$ and C$^5$, with the end-members C$^{20}$ and the rear extension C$^3$, constitute the framework of the carriage C. The lower horizontal bars C$^7$ and C$^8$ (Fig. 7) for holding the harnesses in position are removable from said carriage (Figs. 43 and 44), being held therein by means of the supporting hooks C$^9$ underlying the ends of each of said bars, which supporting hooks are carried in pairs at each end of the carriage C upon the oscillatory shaft C$^{10}$ journaled in the carriage and movable to withdraw said hooks by means of the eccentric lever C$^{11}$ and the connecting link C$^{12}$ between said lever and a bell-crank arm C$^{13}$ rigidly fixed to the shaft C$^{10}$. Directly above each of the lower knife-bars C$^7$ and C$^8$ and resting upon them at their raised ends C$^{21}$ (Fig. 44) is an upper knife-bar C$^{14}$ held in the carriage C by the guides C$^{15}$ and prevented from upward movement by the overlying flat springs C$^{16}$ secured to the end members C$^{20}$ of said carriage, the lower ends of which springs abut against the upper side of said upper knife-bars. The reed is laid flat upon the carriage, being held by a grooved supporting bar C$^{17}$ of the carriage.

A$^{21}$ (Figs. 17 and 18) is a roller mounted in the machine frame in position to support the bar C$^{17}$.

The harnesses, with the knife-bars in position, are hung upon the supporting hooks C$^6$, and the height of the harnesses is adjusted so as to bring the heddle eyes into the proper horizontal plane by raising or lowering said hooks, the shanks of the hooks being provided with teeth adapted to be engaged by a spring detent C$^{18}$ (Fig. 7$^a$) in the body of each hook. The knife-bars are supported by the hooks C$^9$, the spring clips C$^{19}$ inserted between the lower knife-bars and the ends of the lower wooden bars of the harnesses placing a slight pressure on the latter. The knife-bars are inserted into the harness so that one strand from the lower end of each heddle eye crosses a strand from an adjacent eye between the knife-bars. This arrangement, it will be seen, places adjacent eyes of the series in each harness upon opposite sides of (and slightly above) the upper knife-bar.

The harness and reed carriage C is passed through the machine by means of the eye-spacer mechanism acting upon the harness. The reed is not attached to the carriage, one of its bars lying in a groove in said carriage, permitting the reed to be positively fed by a device acting upon its splits. The feed for the harness and reed carriage and the independent feed for the reed will be later described herein.

D is a cam shaft supported in suitable bearings near the upper ends of the bearing posts A$^{16}$ and A$^{17}$. This cam shaft carries a gear D$^1$, the teeth of which mesh with those of the pinion A$^6$ upon the inner end of the drive shaft A$^2$. Between the bearing posts A$^{16}$ and A$^{17}$, the cam shaft D carries the double-throw (axial and radial throw) cams D$^2$ and D$^3$, the first for actuating the eye-pullers, and the latter for actuating the eye-holders, also the double-throw cam D$^4$ for operating the thread-selecting mechanisms, also the cam D$^5$ having the cam-groove D$^6$ (Fig. 21) in its face for actuating the needle bar on the forward side of the machine and the thread-hook on the rear side, also the cam D$^7$ having the double cam-groove D$^8$ (Fig. 5) for operating the eye-detaining forks, all to be hereinafter described. The eye-detaining forks are moved from side to side to detain all of the eyes of both harnesses except the one to be released to the eye-face jaws. Each detaining-fork is swung once for each two drawing-in strokes of the needle, releasing a harness eye for each needle drawing-in stroke. At the end of the cam shaft D outside of the bearing post A$^{17}$ are three cams, one rigidly fixed to the cam shaft D, and the other two mounted upon a sleeve that surrounds said shaft. The cam D⁹ (Fig. 3) has a cam-groove D¹⁰ (Fig. 20) in its face for actuating the feed for the reed. The cam D¹¹, having the cam-groove D¹² (Fig. 24) in its face, moves the eye-facer from side to side to engage a harness eye first of one harness and then of the other. The cam D¹³ having the cam-groove D¹⁴ (Fig. 22) in its face, actuates the relatively movable eye-facer jaw.

As hereinbefore stated, the two cams D¹¹ and D¹² are not secured directly to the cam shaft D, but are fixed upon a sleeve D¹⁵ (Fig. 23) mounted upon the cam shaft D and capable of being locked in engagement with said shaft by means of a dog D¹⁶ (Fig. 22) pivotally secured to the side of the cam D¹³ and adapted to engage a notch D¹⁷ in the periphery of a disk D¹⁸ fixed upon the end of the cam shaft D. The dog D¹⁶ is held in engagement with the notch by the action of a spiral spring D¹⁹ passing across the face of said disk and secured to a pin upon the diametrically opposite side of the cam D¹³. Fixed with relation to the dog D¹⁶ is a lever D²⁶ provided at its ends with crank handles D²⁰ and D²⁷. In case the eye-facer mechanism fails to grasp a thread, the machine stops as hereinafter described. The operator then reaches under the warp carriage, grasps the handle D²⁰ or D²⁷ which is within reach, operates said handle to withdraw the dog D¹⁶ from the notch 17, and by means of said handles turns the cams D¹¹ and D¹² through one revolution, thereby actuating the eye-facer to grasp the missed heddle.

D²⁸ is a stop pin to limit the outward movement of the dog D¹⁶.

The cam D¹³ has in its peripheral face a notch D²¹, which notch must be in coincidence with a corresponding stud upon a throw-out arm before the throw-out mechanism (to be hereinafter described) can be operated. The cam D¹¹ has two diametrically opposite teeth D²² (Figs. 24 and 25) upon its peripheral face, either of which teeth is adapted to engage the plunger of a dash pot to yieldingly stop the machine when the automatic stop mechanism to be hereinafter described operates.

D²⁴ (Fig. 1) is a pinion meshing with the gear D¹. The pinion shaft (not shown) carries the hand-crank D²⁵ by means of which the machine may be manually operated for turning the parts of the mechanism into certain positions.

Before starting a pair of harnesses through the machine, after said harnesses have been properly suspended within the carriage C, it is necessary to separate the two sides of the eye-spacer mechanism, and in order to accomplish this said mechanism is mounted on movable supports, which will now be described.

In the lower part of the bearing posts A¹⁶ and A¹⁷ and mounted in suitable bearings thereon, are rock shafts E and E¹ (Figs. 4 and 25), which shafts have the upwardly extending rock arms E² and E³ in pairs rigidly fixed to the rock shafts E and E¹, respectively. These rock shafts are connected for synchronous movement by the gear-segments E⁴, and the rock arms E² and E³ are provided at their upper ends with bearings for supporting the sliding and oscillating rods E⁵ and E⁶. The rock arm of each pair nearest the head end of the machine has one of the rigid fingers E⁷, which fingers engage the outer prongs of the two eye-detainer forks, to spring said prongs outward when the shafts E and E¹ are turned to separate the two sides of the eye-spacer mechanism. Said shafts are arranged to be rocked by means of a bell-crank lever fixed at the head end of the rock shaft E. One arm E⁸ (Figs. 1 and 22) of this bell-crank lever is provided with an eccentric E⁹ (Fig. 25ᵃ) which is pivotally connected to a block E¹², said block being slidably mounted on the bedplate A¹⁵. Fixed to the axis of the eccentric E⁹ is a hand lever E¹³ by means of which the eccentric may be rocked to raise and lower the arm E⁸ and thus oscillate the shafts E and E¹. The arm E¹⁰ of the bell-crank lever carries a tooth E¹¹ adapted to enter the notch D²¹ in the periphery of the cam D¹³. The tooth normally lies almost in contact with the periphery of said cam, and therefore the throw-out mechanism can be actuated only when the notch and tooth coincide, to wit, when the thread-handling and eye-spacer mechanisms are in the proper position for the throwing-out of said eye-spacer mechanism. The lever E¹⁰, the tooth E¹¹ and the notched disk D¹⁸ also constitute a safety device to prevent actuation of the machine while the eye-spacer mechanism is in thrown-out condition.

The eye-spacer mechanism (Figs. 26, 27, 28, 29 and 30) comprises the eye-detainer forks, the eye-puller fingers with their auxiliary spring fingers, and the holding fingers. There is one eye-detainer fork F for each harness, the two prongs or tines Fᵃ Fᵇ of each fork being rigidly secured together at their bases. Each eye-detainer fork F is pivotally mounted at the upper end of the supporting post A¹⁷, one fork being forward and slightly to one side of the other. The detainer-forks are oscillated by the double cam-groove D⁸ (Fig. 5) in the cam D⁷. The stems F² of said detainer-forks extend downward, and each has a follower F³ in said double cam-groove D⁸ (Fig. 3). The followers pass from the inner groove to the outer one and vice versa as the cam D⁷ is rotated, and, as will be seen, the detainer-forks are swung alternately, each being moved once in every rotation of the cam D⁷, releasing a harness eye first from one harness and then from the other. The strands of the harness being crossed between the knife-bars (C⁷ or C⁸ and C¹⁴, all of the strands will be detained when a prong of the detainer-fork engages on the side of the knife-bar across which the most forward strand passes (Fig. 7). When a prong of the detainer-fork engages on the opposite side, the foremost strand is freed, all subsequent strands being detained. The outer prongs of the eye-detainer forks F are provided with hooks F⁴ adapted to be engaged by fingers E⁷ fixed to the arms E² and E³ of the throw-out mechanism, in order to spring said outer prongs outward to permit the end members C²⁰ of the harness carriage to pass the eye-spacer mechanism. The eye-pullers F⁵, together with their auxiliary spring fingers F⁶, are frictionally held in the upper ends of the puller arms F⁷, and these puller-arms are rigidly mounted upon the sliding and oscillating rods E⁵ and E⁶ journaled in the upper ends of the throw-out arms E² and E³. Two arms F⁸ are fixed to the rods E⁵ and E⁶, respectively, and extend downward, each having at its lower end a roller bearing-block F⁹ (Fig. 26ᵃ) for engaging the dove-tail periphery of the double-throw cam D². Similar roller bearing-blocks are employed in other places upon the machine. Each comprises a body portion $a$, the two rollers $b$ and $c$ fixed in position upon said body portion, and the roller $d$ adjustably movable to and from said fixed rollers $b$ and $c$. A set-screw $e$ extends through a slotted opening in said body portion $a$, and holds the support for said adjustably movable roller in position.

The body of the puller finger F⁵ is provided with a horizontal opening F¹⁰ between the bases of the auxiliary spring fingers F⁶. The holder fingers F¹¹, each extending upward from one of the sleeves F¹² surrounding the shafts E⁵ and E⁶ are adapted to enter the openings F¹⁰ in the puller-fingers. The sleeves F¹² are provided with the downwardly-extending arms F¹³ (Figs. 2 and 3) having the roller bearing-blocks F¹⁴ (Fig. 26ᵃ) for engaging the dove-tail periphery of the double-throw cam D³.

Each eye-puller moves forward and backward by the side of its harness, approaching and entering the harness in conjunction with the eye-holder arm. After entering between the knife-bars, the eye-puller moves toward the unthreaded eyes of its harness, withdrawing from between said knife-bars slightly to raise the points of the auxiliary spring fingers from contact with the sides of the knife-bars. The eye-puller pushes back several of the lower strands of its harness in order to bunch them and permit several to be engaged by the auxiliary spring fingers, as the puller-arm moves toward the knife-bars slightly, also in order to push the strands behind the prong of the detaining-fork. The puller-arm now moves away from the unthreaded harness eyes, the auxiliary spring fingers springing over and releasing the strands that are held by the prong of the detaining-fork, but carrying forward the freed strand. When the eye lies upon the inner side of the upper knife-bar, the lower auxiliary spring finger impinging upon the outer side of the lower knife-bar engages one of the strands passing to said eye; and when the eye is upon the outer side of the upper knife-bar the upper auxiliary finger engages the strand that passes to said harness eye. The puller finger moves forward with the strand thus engaged to a position about midway between the threaded and the unthreaded eyes, where the eye of said strand is grasped by the facer-jaws and held in position for the passage of the needle and the warp thread. At this point the puller-finger withdraws from between the knife-bars, and this completes the cycle of its movement. Continuing to trace the movement of the holder finger, the puller finger is again joined by the holder finger, and they again together enter between the upper and the lower knife-bars. As the puller finger moves toward the unthreaded eyes the holder finger moves forward, drawing forward the threaded eye which at this point is released by the facer-jaws, and holding forward the strands of all the previously threaded eyes. The point of the puller finger is made wedging so as to cam aside and thus push forward any heddle strand which it may meet as it enters between the knife bars; and the point of the holder-finger enters rearward of the wedging surface in order to provide against the accidental lodging of a strand between the puller finger and the holder finger.

The eye-facer mechanism is moved sidewise from one harness to the other by means of a connecting rod G (Fig. 5) extending between the arm G¹ of the oscillatory shaft G² which supports the eye-facer mechanism, and a pivotally mounted bell-crank lever G³, one arm of which bell-crank lever carries a roller G⁴ (Fig. 24) adapted to lie within the cam-groove D¹² in the face of the cam D¹¹. The grasping action of the eye-facer mechanism is produced by the movement of one jaw G⁵ thereof. (See Fig. 31.) This jaw has a vertical movement, and by means of an inclined cam-groove G⁶ at its pivotal center is given a movement toward and from the stationary jaw G⁷. The movable jaw G⁵ is moved toward the stationary jaw by two coiled springs G⁸ and G⁹ (Figs. 2 and 3). The upper end of this movable jaw carries two antifriction rollers G¹⁰ and G¹¹ lying on opposite sides of a bar G¹² curved upon the arc of a circle approximately concentric with the oscillatory shaft G². The curved bar G¹² is fixed between the forked ends of an arm G¹³ rigidly secured to a shaft G¹⁴, which shaft also has the rigid arm G¹⁵, and this arm is connected with one arm of a bell-crank lever G¹⁶ (Fig. 22) by means of a connecting rod G¹⁷. The other arm of the bell-crank lever G¹⁶ carries a roller stud G¹⁸ which lies within the cam-groove D¹⁴ in the face of the cam D¹², and by rotation of said cam moves the connecting rod G¹⁷ and raises and opens the movable jaw of the eye-facing mechanism against the action of the coiled springs G⁸ and G⁹. Fig. 33 illustrates an arrangement of wedges whereby the movable jaw G⁵ is given a slight sidewise or rubbing motion as it closes upon the strands of the harness just above the harness eye, which rubbing movement is intended to lay the strands in the plane of the needle. This straightening of the strands is somewhat assisted by a downward movement of the movable jaw with relation to the fixed jaw after the movable jaw is entirely closed, effecting a downward rubbing movement as well as a sidewise rubbing movement upon the strands. The wedges G¹⁹ and G²⁰ are fixed on the relatively stationary jaw G⁷, while the wedges G²¹ and G²² are fixed to the side of the movable jaw G⁵. When the movable jaw G⁵ is depressed, to be closed, the wedge G²¹ striking against the wedge G¹⁹ forces the relatively movable jaw G⁵ sidewise and gives said jaw a sidewise rubbing movement with relation to the stationary jaw G⁷. When the relatively movable facer-jaw is raised the wedge G²² strikes against the wedge G²⁰ and restores the relatively movable jaw to its normal position. Fig. 32 illustrates the movable jaw in closed position. The jaws G⁵ and G⁷ close upon the strands of the harness above the harness eye and by holding said strands in the plane of movement of the needle face the harness eye to receive the needle and the warp thread. The object of raising the jaw G⁵ in opening the eye-facer is to allow the drawn-in thread to be moved laterally (horizontally) away from the facer.

Two auxiliary eye-facer jaws G²³ and G²⁴ are pivotally mounted at G³¹ upon the relatively stationary eye-facer jaw G⁷. A spring G²⁵ tends to hold the jaws G²³ and G²⁴ in the full-line position shown in Fig. 34. The auxiliary jaws are caused to close upon the eye by the wedges G²⁵ fixed on the sides of the relatively movable facer-jaw G⁵. When the facer-jaw G⁵ approaches its closed position, the auxiliary facer-jaws G²³ and G²⁴ close together upon the heddle eye, grasping said eye at a point just below the upper strands of the harness. In order to free the heddle eye from the auxiliary jaws when the facer-jaws G⁵ and G⁷ are opened, I provide the finger G²⁶ pivotally mounted in a central transverse slot at the lower end of the relatively stationary facer-jaw, which finger is yieldingly pressed forward by the spring G²⁷. To the lower end of the finger G²⁶ is fixed a plate G³² between which and a plate G³⁴ the upper strands of the heddle are clamped side by side when the facer jaws G⁵ and G⁷ are closed. When no eye is grasped by the eye-facer mechanism, the jaws G⁵ and G⁷ close together farther than when a heddle lies between them, whereupon the adjustable set-screw G²⁸ strikes against the lower end of the trigger-lever G²⁹ pivotally mounted upon the relatively stationary facer-jaw, and withdraws the upper hooked end of said trigger-lever from an opening in the end of a lever connecting with the automatic stop mechanism to be hereinafter described. A coiled spring G³⁰ holds the hook of the trigger-lever normally in engagement with said opening.

The thread-selecting mechanism (Figs. 8, 9 and 10, also Figs. 7, 3, 2 and 4) comprises an arm H adjustably mounted upon the stud H¹ fixed with relation to a sliding and oscillatory shaft H² mounted in the stationary bearings H³. An arm H⁴ fixed to the shaft H² carries at its lower end a bearing-block H⁵ (Fig. 26) for grasping the dove-tail periphery of the double-throw cam D⁴. The contour of the cam D⁴ imparts to the upper end of the arm H a motion somewhat triangular in outline, said arm moving forward toward the warp threads, sidewise away from the body of warp threads, and diagonally backward to the first position.

A stem H¹³ (Fig. 8) is pivotally mounted in the upper end of the arm H. Fixed to said stem is a yoke H⁷ in which is pivoted a shaft H²¹ (Fig. 14). To the shaft H²¹ is fixed a selector H⁸. A torsion spring H⁹ anchored at one end to a part fixed to the yoke H⁷ and attached at its other end to an arm H²² fixed on the shaft H²¹ presses the selector H⁸ toward the warp.

H¹⁰ is a stop screw carried by the arm H²² and adapted to impinge upon the yoke H⁷ to limit the action of the spring H⁹.

The angle between the selector and a horizontal plane may be varied by means of an eccentric H¹¹ carried by an arm H¹² fixed to the stem of the yoke H⁷, said eccentric acting upon the arm H. For locking the selector out of action there is provided a latch H¹⁴ (Fig. 15) pivoted on the yoke H⁷ and adapted to be swung against the arm H²² to hold the selector away from the warp. See the dotted line position in Fig. 15.

The selector H⁸ is offset slightly toward the body of warp threads, and is provided on the side toward said threads with two or more thread-hooks or pockets H¹⁵, the one near the forward end of the selector being smallest in size, and those rearward slightly larger, increasing from first to last. The purpose of these thread-hooks H$^{15}$ is to grasp a warp thread, and as it is necessary that only one warp thread be taken by the selector at each stroke thereof, the first hook is made of a size to receive a single small thread. If the first hook is too small to take the thread presented, the second hook, being larger, probably will receive it; if not, the third. If the first hook was made large enough to receive a large thread, it sometimes would grap two small threads, hence the graduation in size of said hooks.

As hereinbefore explained, the warp threads extend across the roughened edge of the strip B$^{14}$ and are deflected (toward the right, Fig. 1) out of a vertical plane. Referring now to Fig. 6: The selector H$^{8}$ reciprocates tranversely of the strip B$^{14}$. As the selector moves forward, one of its hooks picks up the foremost warp thread. As soon as the thread is lifted out of contact with the edge of the strip B$^{14}$, the thread springs into or toward the vertical plane passing through the clamped ends of the thread, the selector yielding laterally against the tension of the spring H$^{9}$. Continuing its forward movement, the selector carries the thread against a device for guiding and releasably holding the thread. Said device comprises a guide I having a passage $v$ for the thread, said passage having an oblique wall $x$ along which the thread is drawn as the selector advances. By means of said oblique wall, the thread and the selector are deflected (to the left Fig. 8) far enough so that the next hook of the selector cannot take a thread from the warp. Beyond the oblique wall $x$ is a guide edge I$^{9}$ along which the thread is pulled by the selector. In the advancing movement of the selector, the thread is carried against a cutter disk, to be later described, whereby the thread is severed and a free end thus provided for the drawing-in operation. To hold said free end and prevent it from jumping and tangling when the tension of the thread is suddenly relieved by the severing operation, I provide below the guide I, a friction thread-holder I$^{4}$ lined with plush. Between the edge I$^{9}$ and the thread-holder I$^{4}$ the thread is held by the spring finger I$^{2}$, the tension of which may be adjusted by means of a set-screw I$^{3}$. As the selector advances the thread is carried into the thread-holder and under the spring finger and severed.

A stripper H$^{16}$ (Figs. 6 and 8) is fixed at the upper end of an oscillatory shaft H$^{17}$ (Figs. 2 and 4) mounted in suitable bearings on the arm H. This shaft is oscillated and the stripper H$^{16}$ moved forward and backward with relation to the arm H and the selector H$^{8}$ by means of a connection between an arm H$^{18}$ fixed to the lower end of said shaft and an arm H$^{19}$ secured to a part of the supporting frame (see Fig. 6). The arms H$^{18}$ and H$^{19}$ have ball-and-socket connections with opposite ends of a connecting rod H$^{20}$, and thus when the arm H is moved forward the stripper also moves forward with relation to said arm. In the continuing movement of the arm H, the stripper H$^{16}$ is caused to swing forward and take the thread from the selector, the thread then extending from the thread-holder I$^{4}$ through a notch I$^{10}$ (Figs. 10 and 12), through the hook of the stripper H$^{16}$ to the upper warp clamp B$^{3}$. The purpose of the stripper is to bring the thread to a definite and uniform position with reference to the needle, notwithstanding the fact that the thread may have been taken by any one of the selector hooks. The stripper also catches any selected thread that may escape from the selector.

A detaining finger I$^{5}$ is pivotally mounted near the forward side of the thread guide and is yieldingly held forward against a stop I$^{6}$ by means of a coiled spring I$^{7}$. The finger I$^{5}$ yields to allow the selected thread to pass it. The purpose of this finger is to hold back a second warp thread that may adhere to the one carried forward by the selector. To prevent such second warp thread from springing to the left (Fig. 8) so that the next hook of the selector would catch it, I provide a stop-shoulder $w$ located at the entrance to the passage $v$.

The thread-severing means above referred to comprises, in the present embodiment, cutter disk J (Fig. 6) fixed near the upper end of a rotary shaft (not shown) which is mounted within a stationary sleeve J$^{1}$ fixed in the frame of the machine. The disk is located below the friction thread-holder I$^{4}$, and is covered by a housing J$^{2}$ open at one point to permit the thread to be pushed in the forward movement of the selector against the disk in order to sever said thread. The cutter disk J is rotated by a cord belt J$^{3}$ (Fig. 1) passing over a sheave J$^{4}$ fixed to the lower end of the cutter shaft, said belt also running over the sheave A$^{8}$ on the drive shaft A$^{2}$ and under guide-sheaves J$^{5}$ rotatably supported within the bed A.

A needle arm K (Fig. 2) is secured rigidly at its lower end to an oscillatory shaft K$^{1}$ pivotally mounted between the centers K$^{2}$ adjustably supported on and projecting from the inner faces of the bearing posts A$^{16}$ and A$^{17}$. This shaft carries an arm K$^{3}$ (Fig. 21) fixed to the shaft K$^{1}$, which arm has a roller stud K$^{4}$ lying within the cam-groove D$^{6}$ of the cam D$^{5}$. At the upper end of the needle arm are two friction clamps K$^{5}$ (Fig. 2) for receiving the stem K$^{6}$ of the needle holder K$^{7}$ (Figs. 5 and the periphery of the disk $D^{13}$ prevents the throw-out mechanism from being operated except when the needle $K^5$ and the reed hook L are out of the harnesses and the reed, respectively, since the notch $D^{21}$ registers with the tooth $E^{11}$ only when the needle and reed hook are in such position.

The mechanism is started and stopped by an ordinary belt shifter N (Fig. 1) operated by a hand-lever $N^1$. This hand-lever has a stud $N^2$ (Figs. 36 and 36$^a$) projecting from its lower face for engaging a two-part notch $N^3$ formed in the side of a bar $N^4$ slidably supported upon the under face of the bed-plate. A coiled spring $N^5$ tends to move the bar $N^4$ in the direction to operate the lever $N^1$ to shift the drive belt to the loose pulley $A^4$, namely, toward the left in Figs. 1, 36 and 36$^a$. The bar $N^4$ is normally locked against movement by a locking plunger $N^7$ engaging in an opening $N^6$ in the bar, said plunger being secured to the horizontal arm $N^8$ of a bell-crank lever $N^9$ pivoted on the standard $A^{18}$ (Fig. 2). This bell-crank lever has an upwardly extending connecting rod $N^{10}$ which connects it with a crank arm $N^{11}$ fixed on one end of an oscillatory shaft $N^{12}$, which shaft carries at its opposite end a trigger-lever $N^{13}$ extending upward into an undercut groove $I^1$ of the thread-guide I. The groove $I^1$ extends beneath the guide $x$ and edges $I^9$ (see Fig. 11). When the selector takes a thread from the warp and pushes the thread against the oblique portion $x$, the selector is deflected to the left (Fig. 8) and is thus prevented from entering the groove $I^1$. In case the selector fails to take a thread, the selector passes into the groove $I^1$ and strikes the trigger lever $N^{13}$. The crank arm $N^{11}$ is provided with an antifriction roller $N^{14}$ (Fig. 37) against which bears the end of the bent finger $N^{15}$ fixed to one end of an arm $N^{16}$ pivoted on the standard $A^{18}$. A coiled spring $N^{17}$ secured to the opposite end of the arm $N^{16}$ presses the finger $N^{15}$ against the roller $N^{14}$. The vertical arm $N^{18}$ of the bell-crank lever $N^9$ constitutes a dashpot to afford a yielding stop for the mechanism. This dashpot comprises a plunger $N^{19}$ (Fig. 38) sliding in the oil cylinder $N^{20}$ and sustained therein by the coiled spring $N^{21}$. The lower end of this cylinder connects with a reservoir $N^{22}$ at the upper end of the dashpot through a small duct $N^{23}$. When the selector fails to grasp a thread, the forward end of said selector strikes against the trigger-lever $N^{13}$, moving said trigger-lever, oscillating the shaft $N^{12}$ upon which it is fixed, and raising the friction roller onto the inclined surface of the bent finger $N^{15}$. The pressure of said finger instantly raises the arm $N^{11}$ and through the connecting rod $N^{10}$ moves the bell-crank lever $N^9$, withdrawing the detent plunger $N^7$ from the opening $N^6$ in the sliding bar $N^4$, and moving the trigger lever $N^{13}$ out of the path of the selector. The spring $N^5$ thereupon draws the bar endwise and moves the shifter-lever $N^1$, throwing the belt from the tight to the loose pulley. The movement of the bell crank lever $N^9$ also throws the plunger $N^{19}$ into the path of one of the teeth $D^{22}$ upon the periphery of the cam $D^{11}$, positively stopping the machine.

The automatic stop for the facer mechanism is attached to the stop mechanism already described. The connecting rod O (Figs. 36 and 37) is slidably connected with the arm $N^{11}$ by means of a loop $O'$ at its lower end. The upper end of this connecting rod is pivotally joined to an arm $O^2$ fixed to one end of a rock shaft $O^3$, (Fig. 5) the opposite end of which rock shaft carries an arm $O^4$ having an opening $O^5$ (Fig. 31) in its forward end adapted to be engaged by a hook at the upper end of the trigger-lever $G^{20}$. A spring $O^6$ turns the shaft $O^3$ when the arm $O^4$ is released by said trigger-lever. When the shaft $O^3$ is thus turned, the resulting upward movement of the connecting rod O raises the lever $N^{11}$ up on the inclined surface of the bent finger $N^{15}$, and the spring $N^{17}$ withdraws the detent plunger $N^7$ from the slidable rod $N^4$, stops the mechanism, and interposes the dashpot $N^{18}$ to the wheel $D^{11}$. The form of the two-part notch $N^3$ permits the hand-lever $N^1$ to be operated independently of and without disturbing the automatic stop mechanism.

The means for sensitively controlling the feed for the warp carriage comprises a finger P (Figs. 2, 4 and 46) suspended on knife-edge bearings $P^1$, the upper end of said finger lying in the path of the warp threads as said threads are presented to the selector $H^8$. The lower end of this finger is curved, and underlies the curved rear end of a pawl $P^2$ that engages the ratchet teeth $P^3$ of the screw-threaded shaft $B^1$ to rotate said shaft to feed the warp carriage forward. The pawl $P^2$ is pivoted on an arm $P^6$ which is fixed to the rock shaft $A^{10}$. A spring $P^7$ tends to hold the pawl $P^2$ in engagement with the ratchet teeth $P^3$. The rear end of the pawl $P^2$ comprises the parts $y$ and $z$, the latter extending farther to the rear than the former.

The operation of the warp feed is as follows: Assuming that the warp is so located with reference to the selector that a feed movement should occur, the lower end of the finger P is then in the position shown in Fig. 47. The pawl $P^2$ moves forward (to the left, Fig. 48), thereby turning the ratchet wheel through the distance of one tooth, and thus advancing the warp carriage. If the warp is thereby brought into proper position with reference to the selector, the pressure of the foremost warp thread against the finger P causes the lower 6) at the forward end of which holder is a split friction clamp $K^8$ for holding the needle $K^9$. The position of the needle is adjusted by moving the needle holder with relation to the arm K. The needle has a reciprocatory motion beside the thread-guide, the notched forward end of the needle engaging the portion of the thread which is stretched between the notch $I^{10}$ and the stripper $H^{16}$ and pushing a bight of said thread through an eye of the harness held by the facer-jaws. At the forward extremity of its movement the needle enters a pocket to be later herein described, and comes to rest with its point within a groove in the thread-hook directly above the point of said hook.

The thread-hook L (Figs. 5 and 6) is pivotally supported upon the supporting standard $A^{18}$ and is oscillated by means of the bell-crank arm $L^1$ (Fig. 21) having a stud $L^2$ lying within the groove $D^6$ of the cam $D^5$, said arm being formed integral with a sleeve $L^3$ loosely supported upon the shaft $K^1$. This sleeve also has an integral arm $L^4$ (Fig. 4) having a connecting rod $L^5$ extending between said arm and a rear extension of said thread-hook. The thread-hook near its forward end and in its forward edge is provided with a groove $L^6$ (Fig. $18^b$) for receiving the end of the needle. The hook when at its forward extremity lies within a guide or pocket $L^7$ (Figs. 17 and 18) which is also subsequently entered by the needle. Upon its upward movement the point of the hook passes through the groove $K^{10}$ (Figs. 17 and $18^b$) near the point of the needle in order to insure that the thread hook shall pick up a thread, even though the thread lies close to the side of the needle. Fixed to the axis of the thread-hook L is a sector-cam $L^8$ having a peripheral cam-groove $L^9$ (Fig. 3). An oscillatory yoke $L^{10}$ (Figs. 5 and 6) and a friction thread-holding wheel $L^{11}$ having radial plush-lined slots $L^{12}$ through which the thread-hook passes, and through which it draws the warp threads, are mounted upon the supporting standard $A^{18}$. The yoke has a roller stud $L^{13}$ lying within the cam-groove $L^9$ of said sector-cam $L^8$, and also carries a spring pressed pawl $L^{14}$ adapted to engage the ratchet teeth $L^{15}$ upon the hub of the thread-holding wheel $L^{11}$. The cam $L^8$ oscillates the yoke $L^{10}$ when the thread-hook is moved and thus rotates the thread-holding wheel a sufficient distance to present a holding slot for each passage of the hook. The reed supported upon the reed and harness carriage is fed through the machine directly beneath the thread-holding wheel, the hook L passing through the holding slots in the wheel and through the reed.

To keep the drawn-in thread out of the way of the eye-facer, I provide a stationary guard $I^8$ (Figs. 5 and 8) at the inner side of the thread-guide I, and a stationary guard $L^{16}$ (Figs. 5, 17 and 18) above the pocket $L^7$, the thread being drawn beneath said guards by the needle. The threads are moved out from under said guards and out of the pocket $L^7$ in the travel of the warp, harnesses and reed and in the rotation of the thread-holding wheel $L^{11}$.

The feed for the reed comprises a plunger M (Figs. 6 and 18) susceptible of a vertical movement and a slight sidewise movement, the lower end of which plunger carries a tooth that is inserted between the splits of the reed, the reed being advanced by the sidewise movement of the plunger. The feed plunger is secured to the rear face of the guide-plate $A^{12}$ by means of a screw $M^1$ passing through a slotted opening $M^2$ in said plunger. A spring $M^3$ tends to hold the plunger downward. At its lower end the plunger is provided with a tooth $M^4$ adapted to enter between the splits of the reed to engage the reed, also to separate the splits for the passage of the thread-hook L. The plunger is actuated for every second movement of the thread-hook, two threads usually being drawn through each space of the reed. A stud $M^7$ secured to the side of an arm $M^8$ of an oscillatory shaft $M^9$ is adapted to engage a square shoulder $M^5$ on the feed plunger M to raise said feed plunger and to impinge upon an inclined surface $M^6$ on the feed plunger to move said plunger sidewise. The oscillatory shaft $M^9$ has an arm $M^{10}$ (Fig. 6) which by means of the rod $M^{11}$ (Fig. 4) is connected with one arm of a pivoted bell-crank lever $M^{12}$, (Fig. 20) mounted on one of the arms $E^2$, the other arm $M^{13}$ of which bell-crank lever carries a roller stud $M^{14}$ adapted to lie within the cam-groove $D^{10}$ of the cam $D^9$. A set-screw $M^{15}$ (Figs. 19 and $19^a$) limits the return side movement of said plunger caused by the action of the coiled spring $M^3$. A detent pawl $M^{16}$ (Fig. 19) pivoted at $M^{20}$ is yieldingly held in engagement with the splits of the reed by means of a coiled spring $M^{17}$. The pawl $M^{16}$ holds the reed in place after each feed movement. Said pawl is provided with a hook $M^{18}$ adapted to be engaged by a similar hook $M^{19}$ extending from the plunger M. When the throw-out lever $E^{13}$ is operated, the movement of the arm $E^2$ on which the bell crank lever $M^{12}$ is mounted causes the plunger M to rise beyond its normal uppermost position, in the course of which movement the projection $M^{19}$ pulls the detent pawl $M^{16}$ from between the splits of the reed.

It will be seen that the system of levers $E^8$, $E^{10}$ and $E^{13}$ serves to simultaneously throw out the reed opener M and lock the driving shaft D. The tooth $E^{11}$ coöperating with end of the finger to swing into the path of the backward movement of the part z of the pawl. As the pawl swings back, the part z rides up on the finger P, thereby raising the forward end of the pawl sufficiently so that on the next forward stroke it will not engage the next tooth of the ratchet wheel; hence the warp carriage will not be advanced. By the time the removal of threads by the selector or the spacing of the threads necessitates another movement of the warp carriage, the lower end of the finger P will have swung out of the path of the part z, so that the pawl may engage the next tooth of the ratchet wheel. The position of the warp carriage is thus automatically adjusted so as properly to present threads to the selector. A light spring $P^4$ normally holds the upper end of the feeler finger P in contact with the foremost thread. Stops $P^5$ and $P^8$ limit the oscillatory movement of the finger P. Said stops are carried by a fixed rod $P^9$ that serves as an abutment to prevent rearward displacement of the lower end of the feeler finger due to the pressure of the part z of the pawl.

It will be seen that the rotatable adjusting element $B^1$, the eye-spacer mechanism and the reed-opener constitute independent mechanisms for differentially moving the warp, the harnesses and the reed with relation to the drawing mechanism and the mechanism for presenting threads to the drawing mechanism.

Generic claims relating to certain features of construction herein disclosed, including the selection and cutting of threads, the bowing of elastic elements, a warp frame having stretching and deflecting means, a heddle stop motion, an automatically movable harness support, a selector having a series of hooks, and a thread stop motion, are contained in my co-pending application Serial No. 228,240 filed October 12, 1904.

I claim as my invention:

1. In a textile machine, in combination, means for supporting a warp; means for taking a thread from said warp; and a sensitively controlled feeding means for moving the warp with relation to said thread-taking means.

2. A machine for drawing warp threads having drawing mechanism, a movable warp support, means for causing relative traversing movement between the mechanism and the warp support, and means for controlling said moving means to correct for variations in the spacing of the warp threads.

3. In a textile machine, in combiantion, means for supporting a warp; means for feeding said warp; and means adapted to be acted upon by a warp thread for suspending the feeding action of said feeding means.

4. In a textile machine, in combination, means for supporting a warp; means for taking a thread from said warp; means for producing a relative feed movement between said warp and the thread-taking means; and means adapted to be acted upon by a warp thread for suspending the feeding action of said feeding means.

5. In a textile machine, in combination, means for supporting a warp; means for taking a thread from said warp; a pawl and ratchet feeding mechanism for producing a relative feed movement between the thread-taking means and the warp; and means adapted to be acted upon by a warp thread for limiting the effective engagement between said pawl and said ratchet.

6. In a textile machine, in combination, means for supporting a warp; means for taking a thread from said warp; a pawl and ratchet feeding mechanism for producing a relative feed movement between the thread-taking means and the warp; and a pivoted two-arm member, one arm of which is adapted to be engaged by a warp thread to place the other arm of the member in position to limit the effective movement of the pawl with relation to its ratchet.

7. In a textile machine, in combination, means for supporting a warp; and means for moving said warp-supporting means, adapted to be held from action by the presence of a warp thread at a point certain with relation to said moving means.

8. In a textile machine, in combination, means for supporting a warp; and means for moving said warp-supporting means, which moving means comprises a sensitive-feed finger adapted to be engaged by a warp thread to hold said moving means from action.

9. In a textile machine, in combination, means for supporting a warp; a pawl and ratchet for moving said warp-supporting means; and a sensitive feed finger adapted to be engaged by a warp thread to hold said pawl from operative engagement with the teeth of the ratchet.

10. In a textile machine, a movable warp support, means including a pawl and ratchet wheel for moving said support, a pivoted two-arm member, one arm of which is adapted to bear against the foremost thread of a warp held on said support and the other arm of which member controls said pawl, and means tending to hold the first mentioned arm against the foremost thread.

11. In a machine for drawing in warp threads, in combination, a supporting frame; a drawing-in mechanism thereon; means for supporting heddles; means for supporting the reed; and means for moving the reed, independently of the heddles, with relation to the drawing-in mechanism.

12. In a textile machine, a warp support, a thread selector arranged to reciprocate across the edge of a warp secured in said support and remove the foremost thread; means for causing relative approaching movement between the warp support and the selector; and a sensitive feeler finger arranged to bear against the foremost thread and to control the moving means.

13. In a machine for preparing warps for weaving, the combination of carriage-supporting means, carriage-adjusting means, and a warp carriage adapted to be supported upon one of said means and lean against the other means, said carriage being adapted to operatively engage the adjusting means.

14. In a machine for preparing warps for weaving, stationary carriage-supporting means, a rotatable carriage-adjusting element, a warp carriage having an element adapted to operatively engage said adjusting element, said carriage being supported in part by said supporting means and in part by said adjusting element, and means for rotating said adjusting element.

15. In a textile machine, a relatively stationary member, a feeding element, and a warp carriage adapted to rest upon said feeding element and lean against said stationary member, said carriage having means to operatively engage said feeding element.

16. In a machine for drawing in warp threads, in combination, a supporting frame; a drawing-in mechanism thereon; means for presenting warp threads to the drawing in mechanism; a carriage for the reed; and means for moving said carriage with relation to the drawing-in mechanism.

17. In a machine for drawing in warp threads, in combination, a supporting frame; a drawing-in mechanism thereon; means for presenting warp threads to the drawing-in mechanism; a carriage for the harness and the reed; and means for moving said carriage with relation to the drawing-in mechanism.

18. In a machine for drawing in warp threads, in combination, a supporting frame; a drawing-in mechanism thereon; a carriage for the warp threads; a carriage for the harness and the reed; means for feeding the warp carriage with relation to the drawing-in mechanism; and means for moving the harness and reed carriage.

19. In a machine for drawing in warp threads, in combination, a supporting frame; a drawing-in mechanism thereon; means for supporting the harness and the reed; means for supporting the warp threads; means for moving the warp threads with relation to the drawing-in mechanism; and means adapted to be engaged by a warp thread for controlling the moving means for the warp threads.

20. In a machine for drawing in warp threads, in combination, a supporting frame; a drawing-in mechanism thereon; a warp carriage; a harness and reed carriage; means for feeding the warp carriage across the supporting frame; means for moving the harness and reed carriage across the supporting frame; and means adapted to be engaged by a warp thread for suspending the feed of the warp carriage.

21. In a machine for drawing in warp threads, in combination, a supporting frame; a drawing-in mechanism thereon; a warp carriage; a harness and reed carriage; means for feeding the warp carriage across the supporting frame; means for moving the harness and reed carriage across the supporting frame; and means comprising a finger adapted to be engaged by a warp thread for suspending the feed of the warp carriage.

22. In a warp-drawing machine, means for supporting a plurality of harnesses, a harness eye facer comprising two jaws adapted to grasp an eye, means for swinging said jaws into position to operate upon any of the harnesses, and means for imparting an upward movement to one of the jaws to release a heddle eye and permit relative separating movement between the facer and the thread extending through said eye.

23. In a warp-drawing machine, means for supporting a plurality of harnesses; an eye facer; means for moving said facer from one harness to another; and means for actuating the facer.

24. In a warp-drawing machine, means for supporting a plurality of harnesses; an eye-facer jaw pivotally supported to swing transversely of the harnesses; a co-acting eye-facer jaw connected to the other jaw to swing therewith; means for causing the jaws to face an eye; and means for causing the jaws to face an eye; and means for swinging the jaws from one harness to another.

25. In a warp-drawing machine, an eye-facer; means for actuating the eye-facer; a stop mechanism; and a device carried by the eye-facer for controlling the stop mechanism.

26. In a warp-drawing machine, an eye-facer; means for actuating the eye-facer; and a member carried by the eye-facer for detecting the absence of a heddle in the facer.

27. In a warp-drawing machine, an eye-facer comprising two relatively movable jaws adapted to close to a greater or less extent dependent upon the presence or absence of a heddle; and a heddle-detector arranged to be engaged by one of said jaws when the jaws close to the greater extent.

28. In a warp-drawing machine, means for supporting a loom harness in substantially vertical planes, means for supporting a loom reed at an angle to the vertical plane of the harness, means for putting threads through the harness eyes, a rotatable thread holder supported adjacent to the reed, and means for taking the threads from said thread-putting means and drawing the threads through the reed and the thread-holder.

29. In a warp-drawing machine, in combination, means for supporting loom harness, means for supporting a loom reed, a needle for drawing threads through the harness eyes, a thread hook arranged to be reciprocated through the reed, and a guide adapted to be entered by said hook and said needle, the hook having a groove near its end for the reception of the end of the needle.

30. In a machine for drawing in warp threads, in combination, a thread-selector; a vibratory needle for putting a selected warp thread through an eye of the harness; a warp carriage; means for feeding said warp carriage; and means adapted to be engaged by a warp thread for holding said feeding means from action.

31. In a machine for drawing in warp threads, in combination, a thread-selector; a vibratory needle for putting a selected warp thread through an eye of the harness; a warp carriage; means for feeding said warp carriage; and a finger adapted to be actuated by a warp thread for suspending the feed of the warp carriage.

32. In a machine for drawing in warp threads, in combination, a thread selector; a vibratory needle for putting a selected warp thread through an eye of the harness; a warp carriage; a feed shaft therefor; a ratchet and a vibratory pawl for moving said feed shaft; and means adapted to be actuated by a warp thread for temporarily withdrawing the pawl from operative engagement with said ratchet.

33. In a machine for drawing in warp threads, in combination, a thread-selector; a vibratory needle for putting a selected warp thread through an eye of the harness; a warp carriage; a feed shaft therefor; a ratchet and a vibratory pawl for moving said feed shaft; and a finger adapted to be actuated by a warp thread for temporarily withdrawing the pawl from operative engagement with said ratchet.

34. In a warp-drawing machine, in combination, means for supporting loom harness; means for supporting a loom reed, a needle for drawing threads through the harness eyes, a thread hook arranged to be reciprocated through the reed, and a guide adapted to be entered by said hook and said needle, the hook being adapted to take the threads from the needle and draw them through the reed.

35. In a machine for drawing in warp threads, in combination, a needle for putting a warp thread through an eye of the harness; a warp carriage; means for feeding said warp carriage; means for supporting the harness and the reed; and means for feeding said harness and reed.

36. In a warp-drawing machine, in combination, means for supporting a loom element, means for placing a thread through the loom element, and a thread holder rotatably mounted adjacent to the loom element, said holder having slots therein for the passage of the thread-placing means, the walls of said slots being lined with thread-holding material.

37. In a machine for preparing warps for weaving, mechanism for putting warp threads through the eyes of loom harnesses and the spaces of a loom reed, mechanism for presenting warp threads to said thread-putting mechanism, and independent mechanisms for differentially moving the warp, the harnesses and the reed with relation to the first mentioned two mechanisms.

38. In a warp-drawing machine, in combination, a movable harness support, a reciprocatory drawing needle, and heddle-positioning devices arranged to move the support with relation to the line of reciprocation of the needle through the action of said devices on the heddles.

39. In a warp-drawing machine, in combination, a movable harness carriage, means for supporting a reed, mechanism for putting warp threads through the harness eyes and the reed spaces, a reed opener adapted to adjust the reed with relation to said mechanism, and devices operating upon the heddles for positioning the heddles and for adjusting the harness with relation to said mechanism.

40. In a warp-drawing machine, the combination of a reed opener, driving means for the reed opener, and means to simultaneously throw out the reed opener and lock the driving means.

41. In a warp-drawing machine, the combination of a reed support, a reed opener, driving means for the reed opener, a device for drawing a thread through the reed, means to throw out the reed opener, and means to lock the driving means, the locking means being actuated by the throw-out means.

42. In a warp-drawing machine, the combination of a reed support, a reed opener, driving means for the reed opener, a device for drawing a thread through the reed, means to throw out the reed opener, and means to prevent actuation of the throw-out means while the drawing device is in the reed.

43. In a warp-drawing machine, the combination of a reciprocatory drawing needle, driving means for the needle, and means to lock the driving means against operation when the needle is retracted.

44. In a warp-drawing machine the combination of a reed opener, driving means, a hand lever and connections for throwing out the reed opener; a wheel connected to the driving means, said wheel having a peripheral notch, and a stud on said lever adapted to enter the notch to lock the driving means.

45. In a warp-drawing machine, the combination of drawing mechanism, a drive shaft for said mechanism, a wheel on the shaft and provided with a peripheral locking notch, a pivoted lever, and a stud on said lever adapted to enter the notch to lock the shaft against rotation.

46. In a warp-drawing machine, the combination of a reciprocatory drawing needle, a drive shaft, a wheel fixed on said shaft, connections between the wheel and the needle for reciprocating the latter, another wheel fixed on the shaft and provided with a peripheral locking notch, and a pivoted lever having a locking stud adapted to enter said notch, said notch being so located with reference to the needle movement that the stud can enter the notch only when the needle is in its retracted position.

47. In a warp-drawing machine, the combination of a loom reed support, a reciprocatory drawing-in needle, a reed opener, mechanism for driving the needle and the reed opener, and means simultaneously to lock the driving mechanism and render the reed opener inoperative.

48. In a machine for drawing in warp threads, in combination, a needle for putting warp threads through the harness eyes; means for presenting warp threads one at a time to said needle; means for holding the harness eyes in position to receive said threads; and a hook adapted to pass through the spaces of the reed to receive a warp thread from the needle and draw said thread through the reed.

49. In a machine for drawing in warp threads, in combination, a needle for putting warp threads through the harness eyes; a selector for selecting a single warp thread; a stripper for holding said warp thread in the path of said needle; facer jaws for holding a harness eye in position to receive a warp thread; and a thread-hook adapted to pass through the spaces of the reed to receive the thread from said needle and draw said thread through the reed.

50. In a machine for drawing in warp threads, a needle for inserting the thread in the harness eye, in combination with a hook for taking the thread from the needle; and a holding clamp for receiving the thread from the hook.

51. A throw-out mechanism for permitting the removal of the harness and reed carriage, comprising movable supports for the eye-spacing devices; and an arm or lever for moving said supports laterally to withdraw said devices from the harness; in combination with the harness and reed carriage and the eye-spacing devices.

52. A frame provided with clamps for holding warp threads, in combination with a screw-threaded feed shaft; a ratchet wheel operatively connected to the shaft; a pawl for rotating said ratchet wheel; and a nut mounted upon said frame and adapted to be thrown into and out of engagement with said screw-threaded feed shaft.

53. In a feeding mechanism for a warp carriage, in combination, a carriage for the warp; a feeding mechanism for the carriage imparting a step-by-step movement thereto; and a finger adapted to be acted upon by a warp thread for temporarily suspending the movement of the warp carriage.

54. In a feeding mechanism for a warp carriage, in combination, a warp-holding frame, a feed shaft for said frame; a ratchet wheel on said shaft; a pawl for the ratchet wheel; means for vibrating said pawl; and a finger for engaging a warp thread, adapted to keep the pawl out of operative engagement with the ratchet wheel.

55. In a feeding mechanism for a warp carriage, in combination, a warp-holding frame; a feed shaft for the frame, a ratchet wheel on said shaft; a pawl for said ratchet wheel, said pawl having a rear end; means for reciprocating said pawl; a finger for engaging one edge of a warp held in said frame, said finger being adapted to engage the rear end of said pawl to raise its forward end from operative engagement with the teeth of said ratchet wheel; and means tending to remove said finger from engagement with said pawl.

56. A harness support provided with two knife-bars located both at one side of the harness eyes, for separating the strands of the harness, the strands crossing between the bars.

57. In a harness support, in combination, means for suspending a harness from its upper bar; means for exerting a downward pressure upon the lower bar to place the harness strands under tension; and two knife-bars located both at one side of the harness eyes for separating the strands of the harness, one strand from each eye crossing between said knife-bars.

58. In a harness support, in combination, means for suspending a harness from its upper bar; means for exerting a downward pressure upon the lower bar to place the harness strands under tension; two knife-bars for separating the harness strands; means for supporting the knife-bars; and means for holding said knife-bars from upward movement.

59. A harness and reed carriage, in combination with mechanism acting upon the reed to feed said reed through the machine.

60. In a means for feeding a reed, in combination, a plunger having a tooth for entering between the splits of the reed and separating the same; and means for vertically reciprocating said plunger and for moving the lower end thereof sidewise.

61. In a means for feeding a reed, in combination, a non-traveling plunger having a tooth for entering between the splits of the reed and separating the same; means for vertically reciprocating and moving said plunger sidewise; and means for adjusting the sidewise movement of said plunger.

62. In an eye-spacing device for harness eyes, in combination, two knife-bars adapted to be inserted into a harness so that they shall lie at one side of the harness eyes and have a strand from each harness eye pass between them, adjacent strands being crossed between said knife-bars; a detaining fork adapted to impinge alternately upon opposite sides of said knife-bars; means for oscillating said detaining fork; an eye-puller for advancing a strand which is not detained by said fork; an eye-holder for further advancing such strands; and separate means for operating the eye-puller and the eye-holder.

63. An eye-puller having a rigid finger and an auxiliary spring finger at each side of said rigid finger.

64. An eye-puller having a rigid finger, and an opening adjacent to said finger, and an auxiliary spring finger at each side of said opening.

65. In a releasing device for harness eyes, in combination, two knife-bars adapted to be inserted into a harness so that they shall lie at one side of the harness eyes and have a strand from each harness eye pass between them, adjacent strands being crossed between said knife-bars; a detaining fork adapted to impinge alternately upon opposite sides of said knife-bars; and means for oscillating said detaining fork.

66. In a spacing device for harness eyes, in combination, two knife-bars adapted to lie at one side of the harness eyes and have a strand from each eye pass between them, adjacent strands of the harness being crossed between said knife-bars; and means for engaging a strand alternately on opposite sides of the knife-bars.

67. In a spacing device for harness eyes, in combination, two knife-bars adapted to lie at one side of the harness eyes and have a strand from each eye pass between them, adjacent strands being crossed between said knife-bars; and an oscillatory detaining fork adapted to impinge alternately upon opposite sides of said knife-bars.

68. In a spacing device for harness eyes, in combination, two knife-bars adapted to lie at one side of the harness eyes and have a strand from each eye pass between them, adjacent strands of the harness passing between the bars being crossed; an oscillatory, detaining fork adapted to impinge alternately upon opposite sides of said knife-bars; and an eye-puller having a finger and two auxiliary spring fingers adjacent to said finger for advancing a strand which is not detained by said fork.

69. A throw-out mechanism comprising rock arms supporting the bearings of the eye-spacers, in combination with the eye-spacers and their bearings; a lever for rocking said arms; and a locking device which permits said operation only at certain positions of the machine.

70. In an automatic stop for a drawing-in machine, in combination, an eye-facing mechanism comprising two facing jaws; a trigger lever for one of said jaws adapted to be engaged by the other jaw; and means actuated by said trigger lever for disconnecting the driving power from the drawing-in machine.

71. In an eye-facer mechanism, in combination, a relatively-stationary jaw; a movable jaw; a trigger lever adapted to be actuated by the movement of one of said jaws; and means adapted to be actuated by said trigger lever for disconnecting the eye-facer mechanism from its driving means.

72. In an eye-facer, in combination, a relatively-stationary jaw; a movable jaw; means for oscillating both of said jaws to grasp harness eyes in different longitudinal series; and means for moving said movable jaw with relation to said relatively stationary jaw.

73. In an eye-facer mechanism, in combination, a relatively-stationary jaw; a movable jaw; means for oscillating both of said jaws to grasp harness eyes in different longitudinal series; auxiliary jaws adapted to be closed by the closing of the movable jaw; a spring finger for freeing the harness eyes from said auxiliary jaws; and means for moving said movable jaw with relation to said relatively-stationary jaw.

74. In a warp-drawing machine, a reciprocating drawing-in needle, independently supported warp-thread clamps, and mechanism to automatically give a differential feed to said clamps at right angles to the line of reciprocation of the needle, to compensate for the difference between the width of the harnesses therein and that of the series of warps.

75. In a mechanism for feeding and operating upon warp-threads, means for holding distended in parallel sequence a series of warp threads; mechanism for separating the threads singly and successively from the series; means for feeding the warp-holding means across the path of movement of the separating means; and means bearing against the contained threads for positioning the warp-holding means and contained threads in relation to the action of the separating means.

76. In a machine for drawing in warp threads, in combination, a supporting frame; a drawing-in mechanism thereon; means for supporting the harness and the reed; means for supporting the warp threads; means for moving the warp threads with relation to the drawing-in mechanism; and means adapted to be engaged by a warp thread for controlling the moving means for the warp threads.

77. A machine for drawing warp threads having a warp support, drawing means, means for causing relative traverse between the warp and the drawing means, and feeling means engaging the foremost threads of the warp.

78. In a machine for operating upon warp threads, the combination with operating means, thread-separating means, means for causing relative progressive movement between the operating means and separating means on the one hand and the threads of the warp on the other hand, and feeling means for alining the warp relatively to the separating and operating means.

79. In a machine for acting upon warp threads, the combination with a movable warp support, of a feeler finger for positioning the warp.

80. A machine for drawing warp threads having drawing mechanism and means for causing relative traversing movement between the same and the warp threads, a movable warp support and means automatically to adjust said support.

81. A machine for acting upon warp threads having means for intermittently acting upon the successive threads of the warp, means for causing relative transverse movement between the said means and the warp, and means causing further relative adjusting movement between successive actions of said thread-acting means.

82. In a warp drawing machine, a carriage, a reciprocating drawing-in needle thereon, independently supported warp-thread-holding devices, and mechanism to automatically feed said devices differentially across the line of reciprocation of the needle.

83. In mechanism for feeding and operating upon warp threads, means for holding distended in parallel sequence a series of warp threads, devices for separating the threads singly and successively from the series, together with a carriage for said separating devices, and mechanism for feeding the warp holding means and contained threads independently and differentially with relation to said carriage.

84. In mechanism for feeding and operating upon warp threads, means for holding distended in parallel sequence a series of warp threads, a device for separating the threads singly and successively from the series together with a carriage for said separating device, means for feeding the warp holding means and contained threads independently and differentially with relation to the carriage, and positioning means bearing against the contained threads in said warp holding means and adapted to position the warp holding means and contained threads in relation to the action of the separating means.

85. In a machine for feeding and operating upon warp threads, means for holding distended in parallel sequence a series of warp threads, a separating device adapted to singly and successively separate threads from the series, means for feeding the warp holding devices and contained threads across the operative path of movement of the separating device, means bearing against the contained warp threads and adapted to govern the position of the warp holding frame, a second frame with contained members, said second frame being parallel to the warp holding frame, devices for operating successively upon the contained members of said second frame and for giving said second frame an independent longitudinal feed and compensating adjustment parallel with the feeding movement of the warp holding means and adapted to maintain said warp holding means and said second frame in coöperative alinement and relation, and auxiliary mechanism associated with said separating device and said operating devices, said auxiliary mechanism being adapted to operate successively upon the disengaged threads.

86. In a machine for operating upon warp threads, a frame which holds one series of parallel elements to be acted upon therein, a second frame which holds another series of elements in substantially parallel sequence, mechanism to separate singly and successively the elements of each series independently, a carriage to support such mechanism, means to cause a traverse of the carriage longitudinally of and relatively to the frames, and means to independently and automatically adjust one of said frames differentially in a direction parallel with the traversing movement of said traversing member.

87. A machine for operating upon a series of warp threads or the like having warp-supporting means, operating means, means for causing relative transverse movement between the same and the warp threads, thread separating means, and means for automatically alining the warp with reference to the separating means.

88. In a warp-treating machine, the combination with a stationary member and two movable members, of mechanism acting automatically to differentially move the said movable members.

89. In a warp-treating machine, two traversing members, and independent mechanisms for automatically and differentially moving the said members.

90. In a machine for operating upon warp threads, in combination, mechanism for progressively acting upon the individual threads of the warp taken in consecutive order from one side thereof to the other, and means for intermittently shifting or justifying the warp by continued slight movements to correct the deviation of the foremost warp-thread from the line of action upon the threads.

91. In a machine for operating upon warp threads, in combination, mechanism for progressively acting upon the individual threads of the warp taken in consecutive order from one side thereof to the other, and means, actuated during the intervals between successive actions upon the individual threads, for intermittently shifting or justifying the warp by continued slight movements to correct the deviation of the foremost warp-thread from the line of action upon the threads.

92. In a mechanism for acting upon warp threads the combination with a movable warp support of a vibratory feeler finger for positioning the warp.

93. In a mechanism for operating upon warp threads the combination with means for holding distended a series of warp threads, mechanism for separating the successive threads of the series, means for feeding the warp holding means to adjust the same relatively to the separating means, and a movable feeler adapted to bear against the contained threads of the warp for governing said positioning means.

94. In a machine for operating upon warp threads, the combination with operating mechanism to act upon said warp threads, of means for holding distended a series of warp threads, warp thread separating means, means for feeding the warp holding means relatively to the separating means, a movable feeler engaging the contained warp threads and governing the action of said warp feeding means, a second holding means with contained members arranged in a generally parallel relation to the warp holding means, and means for giving said second holding means an independent feeding and compensating adjustment parallel with the feeding movement of the warp holding means and adapted to maintain said warp holding means and said second holding means in co-operative alinement and relation.

95. A warp-drawing machine or the like having a drawing needle, a warp support, and a compensating feed mechanism including a vibratory feeling device adapted to contact with the warp threads, a reciprocatory pawl, and a feeding ratchet, said pawl being arranged to be held inoperative relatively to the ratchet by the said feeling device.

96. In a warp-drawing machine for a plurality of loom harnesses, warp-thread-separating mechanism, means for causing a relative movement between the mechanism and harnesses a distance equal to the width of the harnesses, warp-thread clamps, an independent support therefor, and means to feed the support differentially in respect to the said relative movement of the harnesses and warp-separating mechanism a distance equal to the difference between the width of the series of threads and the width of the respective harnesses, during the period of drawing in the entire series of threads.

97. In a warp handling machine, the combination with a warp holding frame of thread taking means and sensitively controlled feeding mechanism for causing relative traverse between the thread taking means and the warp holding frame, said mechanism comprising a feeding ratchet, a feeding pawl, a pawl obstructing member, and feeler finger means controlled by the warp threads to render said obstructing member operative to lift the pawl free from operative engagement with the ratchet teeth.

98. In a warp handling machine, the combination with a warp holding frame and devices to separate and take successive threads from the warp, of a sensitively controlled feeding means for causing a relative traverse between said devices and said frame, said mechanism comprising a main traversing means and a thread feeler free from positive connection to said means and adapted by the thread controlled position thereof to govern said traversing means.

99. In a warp handling machine, the combination with a warp holding frame and devices to separate and take successive threads from the warp, of a sensitively controlled feeding means for causing a relative traverse between said devices and said frame, said mechanism including a feeding ratchet, a pawl and a thread feeler-finger, the latter being free of positive connection to the pawl, but adapted by its thread-controlled position to govern the operative engagement of the pawl with the ratchet.

100. In a feeding mechanism for a warp carriage, in combination, a warp holding frame, a feed shaft for the frame, a ratchet wheel on said shaft, a pawl for said wheel, means for vibrating said pawl, a feeler-finger for engaging a warp thread, said finger in its thread-engaging position being adapted to raise the forward end of the pawl from engagement with the teeth of the ratchet wheel.

101. In a warp handling machine, the combination with a warp holding frame of thread-taking means and sensitively controlled feeding mechanism including a ratchet, a pawl, a reciprocatory pawl actuating arm on which the pawl has pivotal movement only, and a feeler-finger controlled by the warp thread for rendering said pawl ineffective.

102. In a warp handling machine, the combination with a warp holding frame of thread-taking means and sensitively controlled feeding mechanism including a ratchet, a pawl, a reciprocatory pawl actuating arm on which the pawl has pivotal movement only, and a feeler finger adapted in its thread-controlled position to present a part obstructing the effective engagement of the pawl with the ratchet.

103. In a warp handling machine, the combination with a warp holding frame of thread-taking means and sensitively controlled feeding mechanism including a ratchet, a pawl, and a feeler finger movable independently of the pawl.

104. In a warp handling machine, the combination with a warp holding frame of thread-taking means and sensitively controlled feeding mechanism, said mechanism including a ratchet, a pawl, a pawl obstructing member to prevent effective engagement of the pawl, and thread feeler means to render said obstructing member effective when it is in its thread controlled position.

105. In a warp handling machine, the combination with a warp holding frame of thread-taking means and sensitively controlled feeding mechanism, said mechanism including a pawl, a pawl arm on which the pawl is pivoted, and feeler-finger means for obstructing the effective feeding movement of the pawl.

106. In a warp handling machine, the combination with a warp holding frame of thread taking means and sensitively controlled feeding mechanism, said mechanism comprising a pawl, an arm on which the pawl is pivoted, and thread-feeler means for swinging said pawl about its pivot to render it ineffective.

107. In a warp drawing machine, the combination with warp drawing mechanism, of means for moving the warp relatively thereto, and means depending upon the position of the warp relatively to the drawing mechanism for throwing in or out of operation said warp moving means.

HOWARD D. COLMAN.

Witnesses:
 WM. D. HINTZE,
 LOUISE A. CULVER.